(12) United States Patent
Jia et al.

(10) Patent No.: US 11,149,197 B2
(45) Date of Patent: Oct. 19, 2021

(54) PERSISTENT INFRARED PHOSPHORS

(71) Applicant: Bambu Vault LLC, Lowell, MA (US)

(72) Inventors: Weiyi Jia, Chelmsford, MA (US);
Satish Agrawal, Concord, MA (US)

(73) Assignee: Bambu Vault LLC, Lowell, MA (US)

( * ) Notice: Subject to any disclaimer, the term of this patent is extended or adjusted under 35 U.S.C. 154(b) by 282 days.

(21) Appl. No.: 16/282,952

(22) Filed: Feb. 22, 2019

(65) Prior Publication Data
US 2019/0256769 A1    Aug. 22, 2019

Related U.S. Application Data

(60) Provisional application No. 62/633,713, filed on Feb. 22, 2018.

(51) Int. Cl.
*C09K 11/77* (2006.01)

(52) U.S. Cl.
CPC ...... *C09K 11/7701* (2013.01); *C09K 11/7706* (2013.01); *C09K 11/7769* (2013.01);
(Continued)

(58) Field of Classification Search
CPC ............ C09K 11/7701; C09K 11/7706; C09K 11/7769; C09K 11/7774; C09K 11/7787; C09K 11/7792
See application file for complete search history.

(56) References Cited

U.S. PATENT DOCUMENTS

| 7,976,727 B1 * | 7/2011 | Naik ................... | C09K 11/623 |
| | | | 252/301.6 R |
| 2005/0013999 A1 | 1/2005 | Wakefield et al. | |

(Continued)

FOREIGN PATENT DOCUMENTS

| WO | 2009134507 A2 | 11/2009 |
| WO | 2011035292 A2 | 3/2011 |

OTHER PUBLICATIONS

International Search Report dated May 7, 2019 for International Patent Application No. PCT/US2019/019154.
(Continued)

*Primary Examiner* — C Melissa Koslow
(74) *Attorney, Agent, or Firm* — Morgan, Lewis & Bockius LLP

(57) ABSTRACT

Persistent infrared (IR) phosphors are disclosed. In an embodiment a phosphor has the general formula: $M1_{(m-k)}Ga_{(2n-x-y-z)}M2_pO_{(rm+3n+2p)}:xSb^{3+},yM3,zD,kM4$, wherein M1 is chosen from magnesium, calcium, barium, strontium, zinc, scandium, yttrium, lanthanum, gadolinium, lutetium, or bismuth, or combinations thereof; M2 is chosen from silicon, germanium, tin, titanium, zirconium, or combinations thereof; M3 is chosen from magnesium, aluminum, indium, scandium, or combinations thereof; M4 is chosen from praseodymium, neodymium, samarium, europium, terbium, dysprosium, holmium, erbium, thulium, ytterbium, or combinations thereof; D is chosen from chromium, iron, nickel, manganese, or cobalt, or combinations thereof; and wherein $1 \leq m \leq 4$; $1 \leq n \leq 3$; $0 \leq p \leq 5$; $0.0002 \leq x \leq 2n$; $0 \leq y \leq 2n$; $0.0001 \leq z \leq 0.1$; $0 \leq k \leq 0.1$; and r is selected from 1, 1.5, 2, 2.5, and 3.

15 Claims, 12 Drawing Sheets
(2 of 12 Drawing Sheet(s) Filed in Color)

(52) U.S. Cl.
CPC ...... *C09K 11/7774* (2013.01); *C09K 11/7787* (2013.01); *C09K 11/7792* (2013.01)

(56) References Cited

U.S. PATENT DOCUMENTS

| | | |
|---|---|---|
| 2006/0163863 A1 | 7/2006 | Roth et al. |
| 2012/0119143 A1 | 5/2012 | Jia et al. |
| 2012/0193578 A1 | 8/2012 | Pan et al. |

OTHER PUBLICATIONS

Written Opinion dated May 7, 2019 for International Patent Application No. PCT/US2019/019154.

\* cited by examiner

PERSISTENT INFRARED PHOSPHORS

CROSS-REFERENCE TO RELATED APPLICATIONS

This application claims priority to and the benefit of U.S. Provisional Patent Application No. 62/633,713, filed Feb. 22, 2018, which is incorporated herein by reference in its entirety.

BACKGROUND OF THE INVENTION

The present invention generally relates to persistent phosphors and, more particularly, to a long persistent phosphor emitting at the infrared ("IR") wavelengths.

Visible persistent phosphors have been well developed in last century. Stimulated by the applications of visible persistent phosphors, persistent infrared phosphors recently have gained attention in military and security applications.

W. Jia, X. Wang, W. Yen, G. Jia and L. Lewis (WO 2009/134507 A2, incorporated herein by reference) taught that chromium ($Cr^{3+}$)-doped gallium compounds, including trigonal lanthanum gallate $La_3Ga_5GeO_{14}$ and their various derivatives, have strong near IR persistent emission after removal of the excitation, or afterglow, upon UV excitation and that by co-doping with zinc ($Zn^{2+}$) and other ions, such as lithium ($Li^+$), the afterglow and persistence time can be improved. But when chromium absorbs visible light, not enough afterglow can be observed. Therefore, the applications of these phosphors are limited to those that can use UV excitation.

Pan and Lu (WO 2011/035292 A2, incorporated herein by reference) taught that substituting zinc for lanthanum as an ion in the host matrix composition in the gallate germanium phosphors: $Zn_3Ga_2Ge_4O_{14}:Cr^{3+}$ and garnet $Zn_3Ga_2Ge_3O_{12}:Cr^{3+}$ result in phosphors that can be charged relatively efficiently under sunlight or fluorescent lamps. The disadvantage of these two IR phosphors is they contain large amounts of $GeO_2$ and so have limited practical application because of the low natural abundance and high cost of germanium.

R. Naik, L. Brott and G. Jia (U.S. Pat. No. 7,976,727 B1, incorporated herein by reference) developed a series of zinc gallate spinel phosphors doped with chromium, but these gallate spinel phosphors have an emission located near 760 nm and cannot be tuned to longer wavelengths in the spinel structure. The near-infrared ("NIR") vision equipment that detects a range that includes this wavelength are quite common and can be bought easily in the market. Therefore, the phosphors are not as attractive for military and security applications.

Accordingly, there is a need for low cost, persistent IR phosphors that can be charged by visible light.

BRIEF SUMMARY OF THE INVENTION

In some embodiments phosphors according to the present invention may have the general formula:

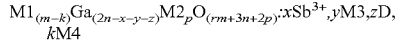

wherein M1 is magnesium, calcium, strontium, barium, zinc, scandium, yttrium, lanthanum, gadolinium, lutetium, bismuth, or combinations thereof; M2 is silicon, germanium, tin, titanium, zirconium, or combinations thereof; M3 is magnesium, aluminum, indium, scandium, or combinations thereof; M4 is praseodymium, neodymium, samarium, europium, terbium, dysprosium, holmium, erbium, thulium, ytterbium, or combinations thereof; and D is chromium, iron, nickel, manganese, or cobalt, or combinations thereof such that $1 \le m \le 4$; $1 \le n \le 3$; $0 \le p \le 5$; $0.0002 \le x \le 2n$; $0 \le y \le 2n$; $0.0001 \le z \le 0.1$; $0 \le k \le 0.1$; and r is selected from 1, 1.5, 2, 2.5, and 3. In some embodiments wherein when M1 comprises magnesium, calcium, strontium, barium, zinc, or a combination thereof, a portion of the magnesium, calcium, strontium, barium, zinc, or combination thereof is optionally substituted with a mixture comprising 50 mole % gallium and 50 mole % lithium, sodium, potassium, or a combination thereof. In some embodiments wherein M1 comprises magnesium, calcium, strontium, barium, zinc, or a combination thereof, a portion of the magnesium, calcium, strontium, barium, zinc, or combination thereof is optionally substituted with a mixture comprising 50 mole % lanthanum, scandium, yttrium, gadolinium, lutetium, or bismuth, or combinations thereof, and 50 mole % lithium, sodium, potassium, or a combination thereof. In some embodiments a portion of M2 may be optionally substituted with a mixture comprising about 50 mole % gallium and about 50 mole % tantalum, niobium, or a combination thereof.

In some embodiments phosphors according to the present invention may have the formula:

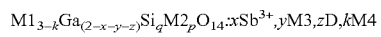

wherein M1 is magnesium, calcium, strontium, barium, zinc, or combinations thereof; M2 is germanium, tin, titanium, of zirconium, or combinations thereof; M3 is aluminum, scandium, indium, or combinations thereof; D is chromium, iron, nickel, manganese, cobalt, or combinations thereof; and M4 is praseodymium, neodymium, samarium, europium, terbium, dysprosium, holmium, erbium, thulium ytterbium, or combinations thereof, or combinations thereof, such that $4 \ge q \ge 1$; $(p+q)=4$; $0.002 \le x \le 2$; $0 \le y \le 2$; $0.0001 \le z \le 0.1$; and $0 \le k \le 0.1$.

In some embodiments phosphors according to the present invention may have the formula:

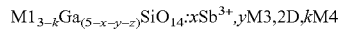

where M1 is lanthanum, gadolinium, yttrium, lutetium, or bismuth, or combinations thereof; M3 is magnesium, aluminum, scandium, indium, or magnesium, or combinations thereof; M4 is praseodymium, neodymium, samarium, europium, terbium, dysprosium, holmium, erbium, thulium, ytterbium, or combinations thereof; and D is chromium, iron, nickel, manganese, or cobalt, or combinations thereof; such that $0.0001 \le x \le 5$; $0 \le y \le 5$; $0.0001 \le z \le 0.2$; and $0 \le k \le 0.1$.

In some embodiments phosphors according to the present invention may have the formula:

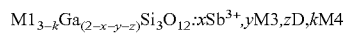

where M1 is calcium, strontium, barium, zinc, or combinations thereof; M3 is magnesium, aluminum, scandium, indium, or magnesium, or combinations thereof; M4 is praseodymium, neodymium, samarium, europium, terbium, dysprosium, holmium, erbium, thulium, ytterbium, or combinations thereof; and D is chromium, iron, nickel, manganese, or cobalt, or combinations thereof; such that $0.002 \le x \le 2$; $0 \le y \le 2$; $0.0001 \le z \le 0.1$; and $0 \le k \le 0.1$.

In some embodiments phosphors according to the present invention may have the formula:

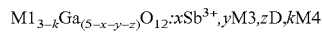

where M1 is lanthanum, gadolinium, yttrium, lutetium, or bismuth, or combinations thereof; M3 is magnesium, aluminum, scandium, indium, or magnesium, or combinations thereof; M4 is praseodymium, neodymium, samarium, europium, terbium, dysprosium, holmium, erbium, thulium, ytterbium, or combinations thereof; and D is chromium, iron, nickel, manganese, or cobalt, or combinations thereof; such that $0.0001 \leq x \leq 5$; $0 \leq y \leq 5$; $0.0001 \leq z \leq 0.2$; and $0 \leq k \leq 0.1$.

In some embodiments phosphors according to the present invention may have the formula:

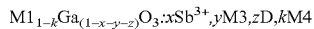

$$M1_{1-k}Ga_{(1-x-y-z)}O_3:xSb^{3+},yM3,zD,kM4$$

where M1 is magnesium, calcium, barium, strontium, scandium, yttrium, lanthanum, zinc, gadolinium, lutetium, or bismuth, or combinations thereof; M3 is magnesium, aluminum, scandium, indium, or magnesium, or combinations thereof; M4 is praseodymium, neodymium, samarium, europium, terbium, dysprosium, holmium, erbium, thulium, ytterbium, or combinations thereof; and D is chromium, iron, nickel, manganese, or cobalt, or combinations thereof; such that $0.002 \leq x \leq 1$; $0 \leq y \leq 1$; $0.0001 \leq z \leq 0.1$; and $0 \leq k \leq 0.1$.

In some embodiments phosphors according to the present invention may have the formula:

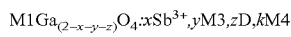

$$M1Ga_{(2-x-y-z)}O_4:xSb^{3+},yM3,zD,kM4$$

wherein M1 is magnesium, calcium, strontium, barium, or zinc, or combinations thereof; wherein M3 is magnesium, aluminum, scandium, indium, or combinations thereof; wherein D is chromium, iron, nickel, manganese, or cobalt, or combinations thereof; and wherein M4 is praseodymium, neodymium, samarium, europium, terbium, dysprosium, holmium, erbium, thulium, ytterbium, or combinations thereof; such that $0.001 \leq x \leq 2$; $0 \leq y \leq 2$; $0.0001 \leq z \leq 0.1$; and $0 \leq k \leq 0.1$.

In some embodiments, D is chosen from one or more of Cr, Ni or Co, wherein the phosphor is capable of exhibiting a persistent emission at wavelengths greater than 900 nm. In some embodiments, phosphors of the present invention may be capable of providing a persistent emission. In some embodiments, the persistent emission includes infrared spectral lines having a full-width half-maximum ("FWHM") bandwidth of less than about 10 nm. In some embodiments, phosphors of the present invention may be capable of being charged with visible light. In some embodiments of the source of visible light may include one or more of sunlight, a fluorescent lamp, UV lamp, a halogen lamp, a tungsten lamp, or a LED lamp, for example. In some embodiments the phosphors of the present invention may be in a form of a powder, ceramic, glass, crystal, or nanoparticle.

In some embodiments a composition for use in paints or inks may include any one or more phosphors as described herein. The composition may further include, for example, a polymer or resin.

BRIEF DESCRIPTION OF THE SEVERAL VIEWS OF THE DRAWINGS

The foregoing summary, as well as the following detailed description of embodiments of the persistent phosphors, will be better understood when read in conjunction with the appended spectral data of exemplary embodiments. It should be understood, however, that the invention is not limited to the precise arrangements for which the spectral data is shown.

In the drawings.

DETAILED DESCRIPTION OF THE INVENTION

Figure 1:
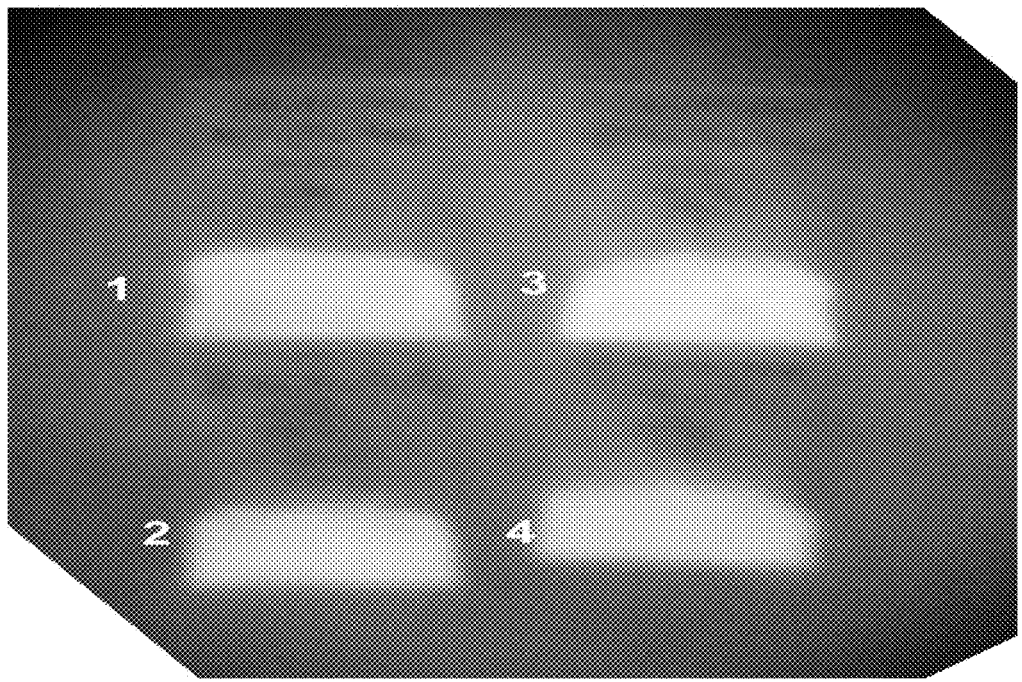
FIG. 1 is a photograph of the IR afterglow, shortly after excitation, of four phosphors in accordance with embodiments of the invention, represented by the formula $Zn_3Ga_2Ge_4O_{14}:0.02Cr^{3+}, xSb^{3+}$, where in (1) x=0.0; (2) x=0.04; (3) x=0.10; (4) x=0.20.

The patent or application file contains at least one drawing executed in color. Copies of this patent or patent application publication with color drawing(s) will be provided by the Office upon request and payment of the necessary fee.

The present invention, according to certain embodiments, provides phosphors which are configured emit in the infrared (IR) and/or near IR wavelengths, for example, from about 700 nm up to about 3000 nm. A phosphor according to some embodiments of the invention comprises a gallate host matrix (e.g., a trigonal lattice) that is doped with antimony in addition to one or more luminescent dopant ions.

In some embodiments, a phosphor according to the present invention may have the general formula of Formula 1:

$$M1_{(m-k)}Ga_{(2n-x-y-z)}M2_pO_{(rm+3n+2p)}:xSb^{3+},yM3,zD,kM4$$

where M1 is an ion chosen from the Group 2 elements, the Group 3 elements, or zinc, gadolinium, lutetium, bismuth, or combinations thereof; M2 is an ion chosen from the Group 14 elements, titanium, zirconium, tantalum, or neodymium, or combinations thereof; M3 is an ion chosen from aluminum, indium, scandium, or magnesium, or combinations thereof; M4 is an ion chosen from the Period 6 (rare earth) elements, or combinations thereof; D is an ion chosen from chromium, iron, nickel, manganese, or cobalt, or combinations thereof; m is greater than or equal to 1 and less than or equal to 4; n is greater than or equal to 1 and less than or equal to 6; p is greater than or equal to 0 and less than or equal to 8; x is greater than or equal to 0.0002 and less than or equal to 4; y is greater than or equal to 0 and less than or equal to 6; z is greater than or equal to zero and less than or equal to 0.2; k is greater than or equal to 0 and less than or equal to 0.1, and r varies from 1 to 3 in units of 0.5 (that is, r is selected from 1, 1.5, 2, 2.5, and 3). Group 2 elements that are useful in phosphors of the invention include magnesium, calcium, strontium, and barium. Group 3 elements that are useful in phosphors of the invention include scandium and yttrium. Group 14 elements that are useful in phosphors of the invention include silicon, germanium, tin, and lead. Period 6 (rare earth) elements that are useful in phosphors of the invention include cesium, barium, lanthanum, cerium, praseodymium, neodymium, promethium, europium, terbium, dysprosium, holmium, erbium, thulium, and ytterbium.

In some embodiments of the invention, antimony ($Sb^+$) ions are incorporated into a gallate phosphor, for example a garnet or a trigonal gallate. It was found that antimony (3+) ion, $Sb^+$, can play an important role in improving both brightness and persistence time for long persistent near-infrared and infrared gallate phosphors. In this way, Sb' acts as an efficient trapping ion in this system.

Incorporation of $Sb^{3+}$ provides the additional advantage that, in some embodiments, gallate phosphors described herein can be efficiently charged by ambient light, including fluorescent lamps and tungsten lamps. Without being bound by theory, it is believed that this is due to the $Sb^{3+}$ providing a high concentration of traps at energy levels below the conduction band, but from which the conduction band may be accessed by modest thermal energies (e.g., at room temperature). This may allow photo-excited electrons from phosphorescent co-dopant ions (e.g, $Cr^{3+}$), including those excited by visible absorption bands, to populate these traps. As a result, in some embodiments the phosphors co-doped with $Sb^{3+}$ can be efficiently charged under ambient light.

Without being bound by theory, in some embodiments the use of Sb' lowers the energy of electronic absorption transition so that absorption occurs at visible wavelengths, which may produce a reflective body color, that is, a body color that arises from the reflection of ambient white light rather than from visible emission. In some embodiments the phosphor has a body color that is white from broadband reflection of white light, blue (e.g., about 430 nm to about 490 nm) from reflection of blue light, green (e.g. about 495 nm to about 570 nm) from reflection of green light, beige (e.g., broadband white reflection with some additional reflection in the yellow band of about 570 nm to about 590 nm) from reflection of beige light, pink (e.g., broadband white with some additional reflection in the red band of about 620 nm to about 700 nm) from reflection of pink light, brown (e.g., reflection of predominantly red, yellow, and blue wavelengths) from reflection of brown light), or dark brown (where saturation may be controlled by the amount of broadband white light that is reflected). The absorption that is responsible for the observed body color may arise from the visible absorption associated with ions that produce the longer wavelength emission, or it may arise from absorption associated with non-emissive ions that are included to produce a desired body color.

$Sb^{3+}$ is almost a universal trapping ion and can behave as a low energy trap in variety of gallate compounds in accordance with embodiments of the invention. Inclusion of $Sb^{3+}$ in some embodiments of the invention enables production of IR persistent phosphors that emit over a wide spectral range. In some embodiments the phosphor exhibits emission at infrared wavelengths, typically from about 700 nm to about 3000 nm, from about 800 nm to about 3000 nm, from about 1000 nm to about 3000 nm, or from about 1200 nm to about 3000 nm. In some embodiments, a phosphor according to the present invention has a peak emission (greatest intensity) at a wavelength that is 700 nm or greater, for example, between 700 nm and 3000 nm, between 700 nm and 2500 nm, between 700 nm and 2000 nm, between 700 nm and 1900 nm, between 700 nm and between 700 nm and 1800 nm, between 700 nm and 1700 nm, between 700 nm and 1600 nm, between 700 nm and 1500 nm, between 700 nm and 1400 nm, between 700 nm and 1300 nm, between 700 nm and 1200 nm, between 700 nm and 1100 nm, between 700 nm and 1000 nm, between 700 nm and 900 nm, or between 700 nm and 800 nm.

In some embodiments the phosphor exhibits persistent emission at infrared and/or near infrared wavelengths. "Persistent emission" as used herein refers to the duration of the emission. For IR emissions, which are not detectable by an unaided human eye, "persistent emission" may be measured using a night vision ocular device, calibrated to eliminate artificial duration caused by background or other light from a source other than the phosphor emission. In some embodiments a phosphor may be considered to have a persistent emission if the emission is detectable for at least 1 minute, at least 10 minutes, at least 60 minutes, at least 2 hours, at least 5 hours, at least 10 hours, at least 12 hours, at least 20 hours, at least 24 hours, at least 30 hours, at least 36 hours, at least 48 hours, at least 60 hours, at least 72 hours, at least 100 hours, at least 120 hours, at least 180 hours, at least 200 hours, at least 240 hours, at least 300 hours, or at least 360 hours using a night vision ocular device. In some embodiments a phosphor may be considered to have a persistent emission if the emission is detectable for at least 1 minute, at least 10 minutes, at least 60 minutes, at least 2 hours, at least 5 hours, at least 10 hours, at least 12 hours, at least 20 hours, at least 24 hours, at least 30 hours, at least 36 hours, at least 48 hours, at least 60 hours, at least 72 hours, at least 100 hours, at least 120 hours, at least 180 hours, at least 200 hours, at least 240 hours, at least 300 hours, or at least 360 hours by a third generation night vision ocular device.

In some embodiments the phosphor exhibits significant persistent emission at infrared and/or near infrared wavelengths. As used herein, "significant" refers to a persistent infrared emission that is perceptible after at least 12 hours using a third generation night vision ocular device. In some embodiments the IR emission is perceptible for at least 48 hours. Each of M1, M2, M3, D, and M4 are described in more detail below. It is understood that each embodiment of M1, M2, M3, D, and M4 described herein may be independently combined according to Formula 1.

In some embodiments, a phosphor according to the present invention may have the general formula of Formula 2a:

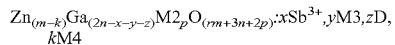

where M2 is an ion chosen from the Group 14 elements, titanium, zirconium, tantalum, or neodymium, or combinations thereof; M3 is an ion chosen from aluminum, indium, scandium, or magnesium, or combinations thereof; M4 is an ion chosen from the Period 6 (rare earth) elements, or combinations thereof; D is an ion chosen from chromium, iron, nickel, manganese, or cobalt, or combinations thereof; m is greater than or equal to 1 and less than or equal to 4; n is greater than or equal to 1 and less than or equal to 6; p is greater than or equal to 0 and less than or equal to 8; x is greater than or equal to 0.0002 and less than or equal to 4; y is greater than or equal to 0 and less than or equal to 6; z is greater than or equal to zero and less than or equal to 0.2; k is greater than or equal to 0 and less than or equal to 0.1, and r varies from 1 to 3 in units of 0.5 (that is, r is selected from 1, 1.5, 2, 2.5, and 3).

In some embodiments, a phosphor according to the present invention may have the general formula of Formula 2b:

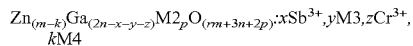

where M2 is an ion chosen from the Group 14 elements, titanium, zirconium, tantalum, or neodymium, or combinations thereof; M3 is an ion chosen from aluminum, indium, scandium, or magnesium, or combinations thereof; M4 is an ion chosen from the Period 6 (rare earth) elements, or combinations thereof; m is greater than or equal to 1 and less than or equal to 4; n is greater than or equal to 1 and less than or equal to 6; p is greater than or equal to 0 and less than or equal to 8; x is greater than or equal to 0.0002 and less than or equal to 4; y is greater than or equal to 0 and less than or equal to 6; z is greater than or equal to zero and less than or equal to 0.2; k is greater than or equal to 0 and less than or equal to 0.1, and r varies from 1 to 3 in units of 0.5 (that is, r is selected from 1, 1.5, 2, 2.5, and 3).

In some embodiments, a phosphor according to the present invention may have the general formula of Formula 2c:

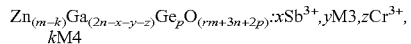

where M3 is an ion chosen from aluminum, indium, scandium, or magnesium, or combinations thereof; M4 is an ion chosen from the Period 6 (rare earth) elements, or combinations thereof; m is greater than or equal to 1 and less than or equal to 4; n is greater than or equal to 1 and less than or equal to 6; p is greater than or equal to 0 and less than or equal to 8; x is greater than or equal to 0.0002 and less than or equal to 4; y is greater than or equal to 0 and less than or equal to 6; z is greater than or equal to zero and less than or equal to 0.2; k is greater than or equal to 0 and less than or equal to 0.1, and r varies from 1 to 3 in units of 0.5 (that is, r is selected from 1, 1.5, 2, 2.5, and 3).

In some embodiments, a phosphor according to the present invention may have the general formula of Formula 2d:

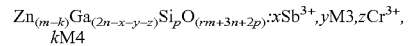

where M3 is an ion chosen from aluminum, indium, scandium, or magnesium, or combinations thereof; M4 is an ion chosen from the Period 6 (rare earth) elements, or combinations thereof; m is greater than or equal to 1 and less than or equal to 4; n is greater than or equal to 1 and less than or equal to 6; p is greater than or equal to 0 and less than or equal to 8; x is greater than or equal to 0.0002 and less than or equal to 4; y is greater than or equal to 0 and less than or equal to 6; z is greater than or equal to zero and less than or equal to 0.2; k is greater than or equal to 0 and less than or equal to 0.1, and r varies from 1 to 3 in units of 0.5 (that is, r is selected from 1, 1.5, 2, 2.5, and 3).

In some embodiments, a phosphor according to the present invention may have the general formula of Formula 2e:

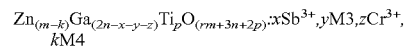

where M3 is an ion chosen from aluminum, indium, scandium, or magnesium, or combinations thereof; M4 is an ion chosen from the Period 6 (rare earth) elements, or combinations thereof; m is greater than or equal to 1 and less than or equal to 4; n is greater than or equal to 1 and less than or equal to 6; p is greater than or equal to 0 and less than or equal to 8; x is greater than or equal to 0.0002 and less than or equal to 4; y is greater than or equal to 0 and less than or equal to 6; z is greater than or equal to zero and less than or equal to 0.2; k is greater than or equal to 0 and less than or equal to 0.1, and r varies from 1 to 3 in units of 0.5 (that is, r is selected from 1, 1.5, 2, 2.5, and 3).

In some embodiments, a phosphor according to the present invention may have the general formula of Formula 3a:

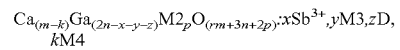

where M2 is an ion chosen from the Group 14 elements, titanium, zirconium, tantalum, or neodymium, or combinations thereof; M3 is an ion chosen from aluminum, indium, scandium, or magnesium, or combinations thereof; M4 is an ion chosen from the Period 6 (rare earth) elements, or combinations thereof; D is an ion chosen from chromium, iron, nickel, manganese, or cobalt, or combinations thereof; m is greater than or equal to 1 and less than or equal to 4; n is greater than or equal to 1 and less than or equal to 6; p is greater than or equal to 0 and less than or equal to 8; x is greater than or equal to 0.0002 and less than or equal to 4; y is greater than or equal to 0 and less than or equal to 6; z is greater than or equal to zero and less than or equal to 0.2; k is greater than or equal to 0 and less than or equal to 0.1, and r varies from 1 to 3 in units of 0.5 (that is, r is selected from 1, 1.5, 2, 2.5, and 3).

In some embodiments, a phosphor according to the present invention may have the general formula of Formula 3b:

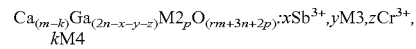

where M2 is an ion chosen from the Group 14 elements, titanium, zirconium, tantalum, or neodymium, or combinations thereof; M3 is an ion chosen from aluminum, indium, scandium, or magnesium, or combinations thereof; M4 is an ion chosen from the Period 6 (rare earth) elements, or combinations thereof; m is greater than or equal to 1 and less than or equal to 4; n is greater than or equal to 1 and less than or equal to 6; p is greater than or equal to 0 and less than or equal to 8; x is greater than or equal to 0.0002 and less than or equal to 4; y is greater than or equal to 0 and less than or equal to 6; z is greater than or equal to zero and less than or equal to 0.2; k is greater than or equal to 0 and less than or equal to 0.1, and r varies from 1 to 3 in units of 0.5 (that is, r is selected from 1, 1.5, 2, 2.5, and 3).

In some embodiments, a phosphor according to the present invention may have the general formula of Formula 3c:

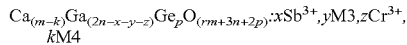
$$Ca_{(m-k)}Ga_{(2n-x-y-z)}Ge_pO_{(rm+3n+2p)}:xSb^{3+},yM3,zCr^{3+},kM4$$

where M3 is an ion chosen from aluminum, indium, scandium, or magnesium, or combinations thereof; M4 is an ion chosen from the Period 6 (rare earth) elements, or combinations thereof; m is greater than or equal to 1 and less than or equal to 4; n is greater than or equal to 1 and less than or equal to 6; p is greater than or equal to 0 and less than or equal to 8; x is greater than or equal to 0.0002 and less than or equal to 4; y is greater than or equal to 0 and less than or equal to 6; z is greater than or equal to zero and less than or equal to 0.2; k is greater than or equal to 0 and less than or equal to 0.1, and r varies from 1 to 3 in units of 0.5 (that is, r is selected from 1, 1.5, 2, 2.5, and 3).

In some embodiments, a phosphor according to the present invention may have the general formula of Formula 3d:

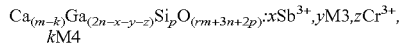
$$Ca_{(m-k)}Ga_{(2n-x-y-z)}Si_pO_{(rm+3n+2p)}:xSb^{3+},yM3,zCr^{3+},kM4$$

where M3 is an ion chosen from aluminum, indium, scandium, or magnesium, or combinations thereof; M4 is an ion chosen from the Period 6 (rare earth) elements, or combinations thereof; m is greater than or equal to 1 and less than or equal to 4; n is greater than or equal to 1 and less than or equal to 6; p is greater than or equal to 0 and less than or equal to 8; x is greater than or equal to 0.0002 and less than or equal to 4; y is greater than or equal to 0 and less than or equal to 6; z is greater than or equal to zero and less than or equal to 0.2; k is greater than or equal to 0 and less than or equal to 0.1, and r varies from 1 to 3 in units of 0.5 (that is, r is selected from 1, 1.5, 2, 2.5, and 3).

In some embodiments, a phosphor according to the present invention may have the general formula of Formula 3e:

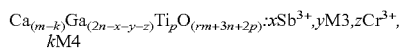
$$Ca_{(m-k)}Ga_{(2n-x-y-z)}Ti_pO_{(rm+3n+2p)}:xSb^{3+},yM3,zCr^{3+},kM4$$

where M3 is an ion chosen from aluminum, indium, scandium, or magnesium, or combinations thereof; M4 is an ion chosen from the Period 6 (rare earth) elements, or combinations thereof; m is greater than or equal to 1 and less than or equal to 4; n is greater than or equal to 1 and less than or equal to 6; p is greater than or equal to 0 and less than or equal to 8; x is greater than or equal to 0.0002 and less than or equal to 4; y is greater than or equal to 0 and less than or equal to 6; z is greater than or equal to zero and less than or equal to 0.2; k is greater than or equal to 0 and less than or equal to 0.1, and r varies from 1 to 3 in units of 0.5 (that is, r is selected from 1, 1.5, 2, 2.5, and 3).

In some embodiments, a phosphor according to the present invention may have the general formula of Formula 4a:

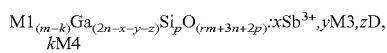
$$M1_{(m-k)}Ga_{(2n-x-y-z)}Si_pO_{(rm+3n+2p)}:xSb^{3+},yM3,zD,kM4$$

where M1 is an ion chosen from the Group 2 elements, the Group 3 elements, or zinc, gadolinium, lutetium, bismuth, or combinations thereof; M3 is an ion chosen from aluminum, indium, scandium, or magnesium, or combinations thereof; M4 is an ion chosen from the Period 6 (rare earth) elements, or combinations thereof; D is an ion chosen from chromium, iron, nickel, manganese, or cobalt, or combinations thereof; m is greater than or equal to 1 and less than or equal to 4; n is greater than or equal to 1 and less than or equal to 6; p is greater than or equal to 0 and less than or equal to 8; x is greater than or equal to 0.0002 and less than or equal to 4; y is greater than or equal to 0 and less than or equal to 6; z is greater than or equal to zero and less than or equal to 0.2; k is greater than or equal to 0 and less than or equal to 0.1, and r varies from 1 to 3 in units of 0.5 (that is, r is selected from 1, 1.5, 2, 2.5, and 3).

In some embodiments, a phosphor according to the present invention may have the general formula of Formula 4b:

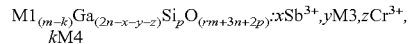
$$M1_{(m-k)}Ga_{(2n-x-y-z)}Si_pO_{(rm+3n+2p)}:xSb^{3+},yM3,zCr^{3+},kM4$$

where M1 is an ion chosen from the Group 2 elements, the Group 3 elements, or zinc, gadolinium, lutetium, bismuth, or combinations thereof; M3 is an ion chosen from aluminum, indium, scandium, or magnesium, or combinations thereof; M4 is an ion chosen from the Period 6 (rare earth) elements, or combinations thereof; m is greater than or equal to 1 and less than or equal to 4; n is greater than or equal to 1 and less than or equal to 6; p is greater than or equal to 0 and less than or equal to 8; x is greater than or equal to 0.0002 and less than or equal to 4; y is greater than or equal to 0 and less than or equal to 6; z is greater than or equal to zero and less than or equal to 0.2; k is greater than or equal to 0 and less than or equal to 0.1, and r varies from 1 to 3 in units of 0.5 (that is, r is selected from 1, 1.5, 2, 2.5, and 3).

In some embodiment, a phosphor according to the present invention may have the general formula of Formula 4c:

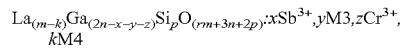
$$La_{(m-k)}Ga_{(2n-x-y-z)}Si_pO_{(rm+3n+2p)}:xSb^{3+},yM3,zCr^{3+},kM4$$

where M3 is an ion chosen from aluminum, indium, scandium, or magnesium, or combinations thereof; M4 is an ion chosen from the Period 6 (rare earth) elements, or combinations thereof; m is greater than or equal to 1 and less than or equal to 4; n is greater than or equal to 1 and less than or equal to 6; p is greater than or equal to 0 and less than or equal to 8; x is greater than or equal to 0.0002 and less than or equal to 4; y is greater than or equal to 0 and less than or equal to 6; z is greater than or equal to zero and less than or equal to 0.2; k is greater than or equal to 0 and less than or equal to 0.1, and r varies from 1 to 3 in units of 0.5 (that is, r is selected from 1, 1.5, 2, 2.5, and 3).

In some embodiments, a phosphor according to the present invention may have the general formula of Formula 4d:

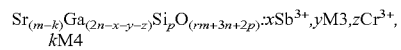
$$Sr_{(m-k)}Ga_{(2n-x-y-z)}Si_pO_{(rm+3n+2p)}:xSb^{3+},yM3,zCr^{3+},kM4$$

where M3 is an ion chosen from aluminum, indium, scandium, or magnesium, or combinations thereof; M4 is an ion chosen from the Period 6 (rare earth) elements, or combinations thereof; m is greater than or equal to 1 and less than or equal to 4; n is greater than or equal to 1 and less than or equal to 6; p is greater than or equal to 0 and less than or equal to 8; x is greater than or equal to 0.0002 and less than or equal to 4; y is greater than or equal to 0 and less than or equal to 6; z is greater than or equal to zero and less than or equal to 0.2; k is greater than or equal to 0 and less than or equal to 0.1, and r varies from 1 to 3 in units of 0.5 (that is, r is selected from 1, 1.5, 2, 2.5, and 3).

M1

In some embodiments of the phosphor, M1 may be selected from one or more Group 2 elements. Group 2 elements may include beryllium, magnesium, calcium, barium, strontium, and radium. In some embodiments of the phosphor, M1 may be selected from one or more Group 3 elements. Group 3 elements may include scandium, yttrium, lanthanum, actinium, and lawrencium. In some embodiments of the phosphor, M1 may be selected from one or more of zinc, gadolinium, lutetium, and bismuth. In some embodiments of the phosphor, M1 may be selected from one or more of beryllium, magnesium, calcium, barium, strontium, radium, scandium, yttrium, lanthanum, actinium, lawrencium, zinc, gadolinium, lutetium, and bismuth.

In some embodiments, a portion of M1 can be replaced with a composition having an average valence equal to that of M1. The composition is chosen so as to maintain the average valence of the M1 ion being substituted. For this purpose, it is useful to describe a valence parameter, r, that is equal to one-half of the valence of the substituted ion. For Group 2 elements with a valence of 2+, r=1, while for Group 3 elements with a valence of 3+, r=3/2. In some embodiments the composition comprises a mixture of ions (which may have the same or different chemical identities) having an average valence parameter that is equal to the valence parameter of M1. For example, where M1 is an ion of a Group 2 element such as calcium (e.g., a 2+ ion), a portion of M1 may be substituted with a mixture comprising or consisting essentially of 50% of an ion of a Group 1 element such as sodium or lithium (a 1+ ion) and 50% of gallium (a 3+ ion). In some embodiments up to 0.1%, up to 0.5%, up to 1%, up to 2%, up to 3%, up to 4%, up to 5%, up to 10%, up to 15%, up to 20%, up to 25%, up to 30%, or up to 50% of M1 can be substituted a mixture comprising or consisting essentially of 50% of an ion of a 1+ ion and 50% of a 3+ ion.

In some embodiments more traps from oxygen voids, that can lead to increased persistent afterglow, can be produced if some ions with higher valence state are substituted with lower valence ions. For example, La' can be substituted in part or replaced entirely with Zn', Ca' can be substituted in part or replaced entirely with Li$^r$, and/or Ga' can be substituted in part with Mg'.

M2

In some embodiments of the phosphor, M2 may be selected from one or more Group 14 elements. Group 14 elements may include, silicon, germanium, tin, and lead. In some embodiments of the phosphor, M2 may be selected from one or more of titanium, zirconium, tantalum, and neodymium. In some embodiments of the phosphor, M2 may be selected from one or more of silicon, germanium, tin, lead, titanium, zirconium, tantalum, and neodymium.

In some embodiments of the phosphor, M2 is an ion of 4+ oxidation state. In a manner similar to that described for substitutions for M1, a portion of M2 ion having a 4+ oxidation state may be substituted with a mixture of 50 mole % ion having a 3+ oxidation state and 50 mole % 1+ oxidation state. For example, an ion such as silicon (4+) may be substituted with a mixture comprised of 50% of gallium (a 3+ ion) and 50% of tantalum (a 5+ ion), such that the average valence of the mixture is 4+. Other 5+ ions may be used instead of tantalum. Such phosphors may be less expensive than those formulated using germanium due to the relative abundance of many of these elements. The substitution of alternate elements into the phosphor matrix is further enabled by the addition of antimony to the dopants, leading to longer and brighter persistent emission.

Figure 3:
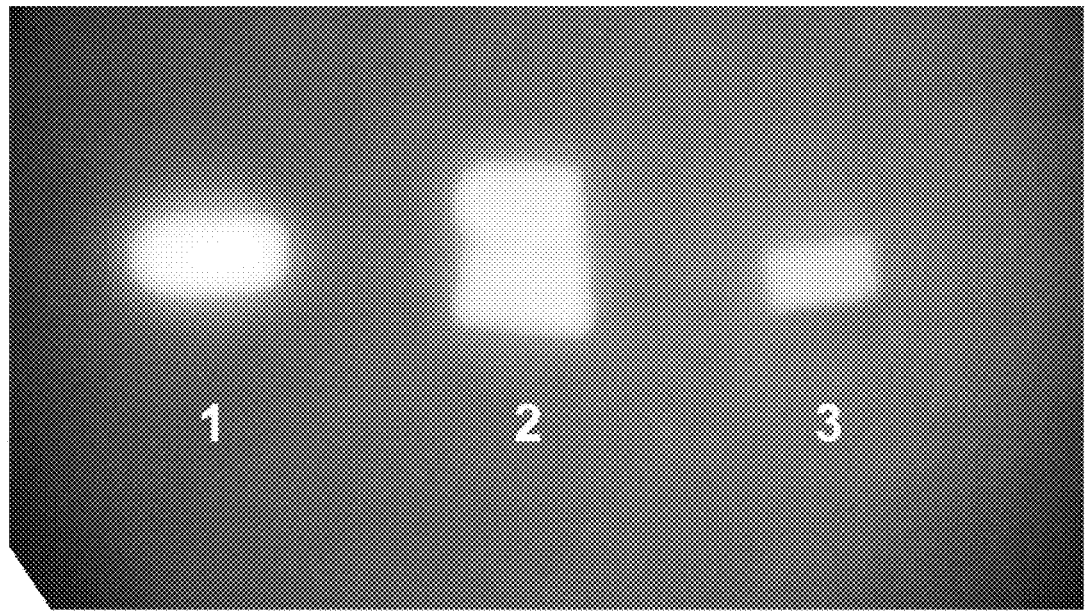
FIG. 3 is a photograph of the IR afterglow, shortly after excitation, of three phosphors each in accordance with an embodiment of the invention, (1) Garnet gallate $Zn_3Ga_2Si_3O_{12}:0.02Cr^{3+},0.3Sb^{3+}$; (2) Trigonal gallate $Ca_3Ga_2Ti_4O_{14}:0.02Cr^{3+},0.3Sb^{3+}$; and (3) lanthanum gallate $La_3Ga_5SiO_{14}:0.02Cr^{3+},0.3\ Sb^{3+}$.
Figure 8:
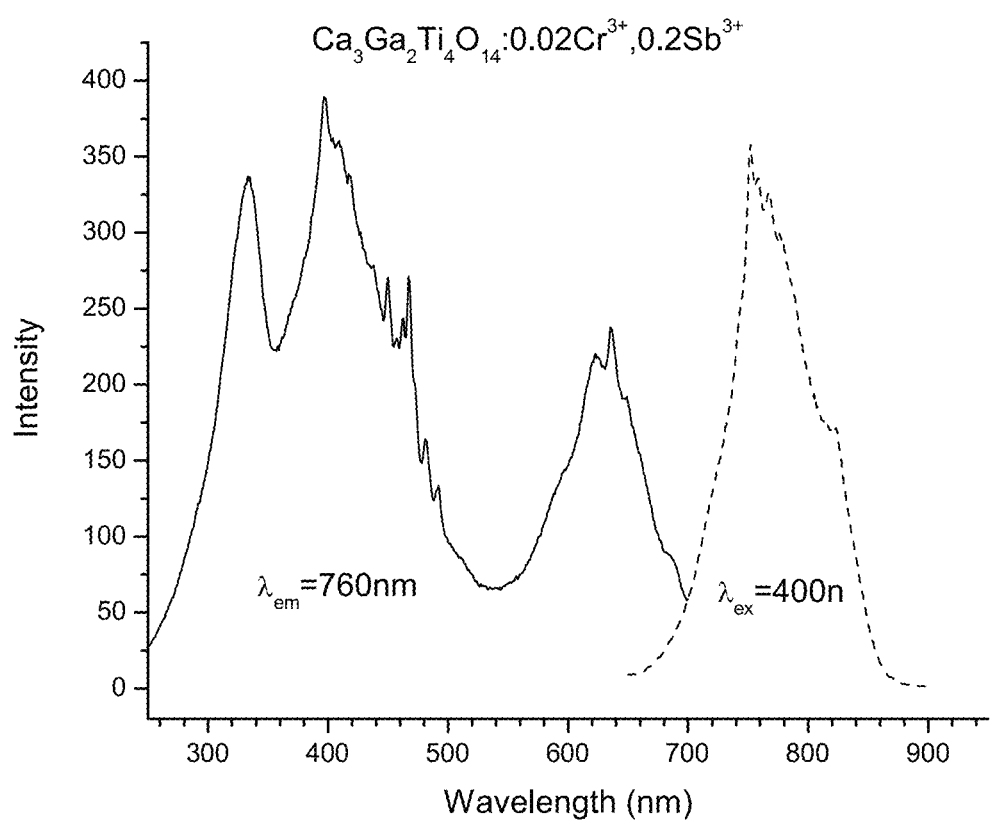
FIG. 8 shows the excitation and emission spectra of a phosphor in accordance with an embodiment of the invention, represented by the formula $Ca_3Ga_2Ti_4O_{14}:0.02Cr^{3+}, 0.2Sb^{3+}$.

In some embodiments of the phosphor, a titanium gallate, such as, $Ca_3Ga_2Ti_4O_{14}$: $Cr^{3+}$ is co-doped with $Sb^{3+}$. Such phosphors may provide a much brighter afterglow, as shown in FIG. 3 and FIG. 8, with much longer luminous persistence than analogous phosphors that are not co-doped with $Sb^{3+}$. Without $Sb^{3+}$, the afterglow of the titanium gallate phosphor is almost undetectable (not shown). The phosphors doped with $Sb^{3+}$ can be charged by fluorescent room lamps, halogen lamps and tungsten lamps.

M3

In some embodiments, the phosphor includes an ion M3. M3 may be one or more metal ions having a 3+ oxidation state, such as aluminum, scandium, and indium, or magnesium (a 2+ ion). In some embodiments M3 is substituted for gallium in the phosphor lattice. Incorporation of Sb' in the phosphor may enhance the emission and persistence of the phosphor luminescence, allowing gallium ion to be largely replaced by one or more M3 ions, for example aluminum, or other metals, metal ion, or metal oxides having a lower cost than gallium oxide. In some embodiments a portion of gallium is substituted with M3, e.g., up to 10 mole %, up to 20 mole %, up to 30 mole %, up to 40 mole %, or up to 50 mole %. In some embodiments a majority of gallium is substituted with M3, e.g., up to 60 mole %, up to 70 mole %, or up to 80 mole %.

In addition, the replacement of a portion of the gallium by one or more M3 ions can have other beneficial effects on characteristics of emission. For example, when gallium is partially substituted with small ions like aluminum, the emission of an emitting ion D (e.g., $Cr^{3+}$) will shift to shorter wavelengths, while with larger ions such as $In^{3+}$ or $Sc^{3+}$, the emission of an emitting ion D (e.g., $Cr^{3+}$) will shift to the longer wavelengths. $Sb^{3+}$ traps are still efficiently active to the enhance the persistence of the afterglow with such modifications (e.g. substitution of a portion of gallium with M3) to the host matrix.

Figure 9:
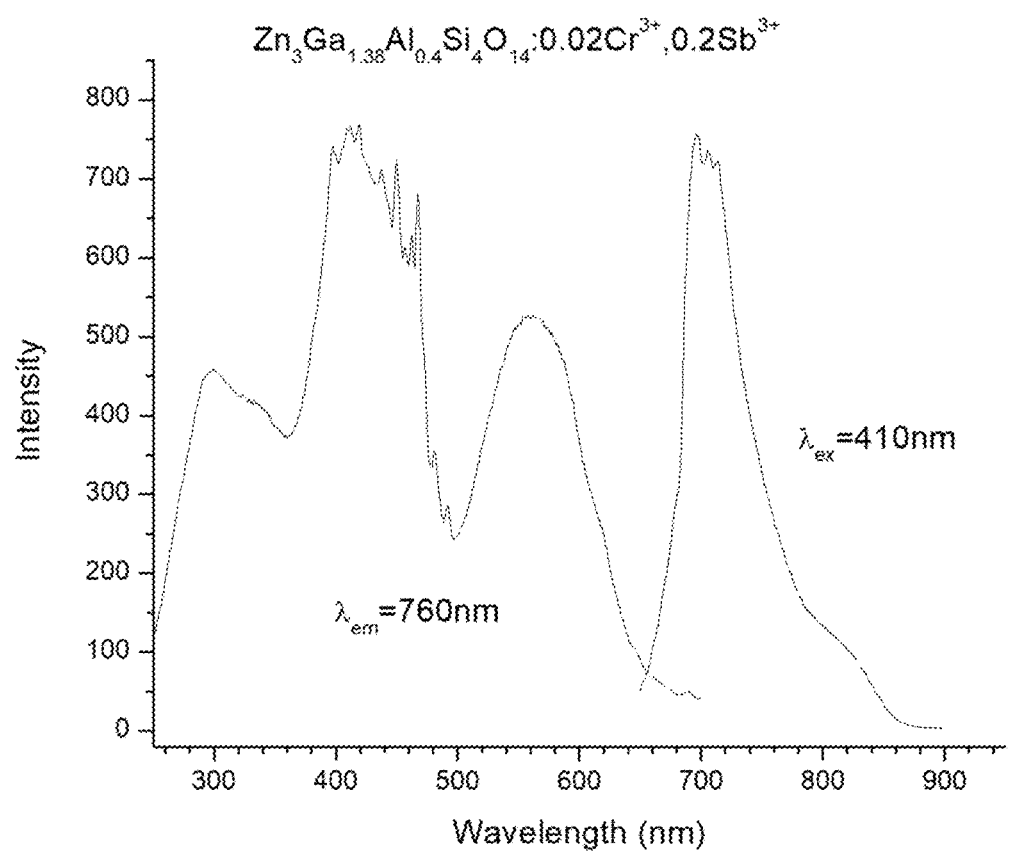
FIG. 9 shows the excitation and emission spectra of a phosphor in accordance with an embodiment of the invention, represented by the formula $Zn_3Ga_{1.38}Al_{0.4}Si_4O_{14}:0.02Cr^{3+},0.2Sb^{3+}$.

Another advantage of some embodiments of the invention that include Sb' incorporated in a gallate phosphor is that at least a portion, and in some embodiments a majority, e.g., up to about 60 mole %, up to about 70 mole %, or up to about 80 mole % of gallium can be replaced with aluminum. Without being bound by theory, it is believed that because of the presence of Sb', traps created by host defects of oxygen voids related to the presence of gallium are no longer as important and therefore the concentration of gallium in the hosts can be reduced. Gallium is expensive and replacing at least a portion, or a large part of gallium with aluminum can reduce cost. Accordingly, in some embodiments of the invention IR persistent phosphors of the invention have the advantage of reduced cost. FIG. 9 illustrates the excitation and emission spectra of an example phosphor according to one embodiment in which gallium has been partially substituted by aluminum.

D

In some embodiments of the phosphor, D is an emissive ion that may be selected from one or more of chromium, iron, nickel, manganese, and cobalt. In some embodiments of the phosphor, D is a metal or ion dopant that substitutes for gallium in the phosphor lattice.

In some embodiments the phosphor is doped with one or more ions (D) that can provide some emission at near IR wavelengths, typically at $\lambda_{em}$>~700 nm, for example from about 700 nm to about 3000 nm, from about 800 nm to about 3000 nm, from about 1000 nm to about 3000 nm, or from about 1200 nm to about 3000 nm. In some embodiments the phosphor is doped with one or more D ions selected from trivalent chromium ($Cr^{3+}$), divalent nickel ($Ni^{3+}$), and divalent cobalt ($Co^{3+}$).

Typically in garnets ($A_3B_2Si_3O_{12}$, wherein A and B are divalent and trivalent metals, respectively) and trigonal gallates, D ions (e.g. $Cr^{3+}$ ions) will replace $Ga^{3+}$. There are two crystal sites for gallium: tetrahedral sites and octahedral sites. $Cr^{3+}$ has a $3d^3$ electronic configuration, and prefers to stay at octahedral sites. Free $Cr^{3+}$ ions have a $^4F$ ground state with seven-fold orbital degeneracy. In the cubic symmetry of octahedral sites, the $^4F$ state splits into three quartet states, $^4A_2$ ($t_2^3$), $^4T_2(t_2^2e)$ and $^4T_1(t_2^3)$ given in order of increasing energy. The first excited state of the free ion is $^2G$, which in the crystal field splits into $^2E$, $^2T_1$, $^2T_2$ and $^2A_1$ with doublet $^2E$ as the lowest in the octahedral cubic field. With increasing crystalline field, $^4T_2$ and $^4Ti$ will increase in energy relatively to the ground state $^4A_2$, while $^2E$ (and $^2Ti$) almost remains constant in energy, and eventually cross over with $^4T_2$. If $^4T_2$ is greater than $^2E$, the later will serve as the metastable state and gives sharp line emissions in deep red near 690 nm. If $^4T_2$ is lower than $^2E$, then $^4T_2$ will serve as the metastable state, and a broad band emission at much longer wavelength will be produced. It is called low field emission. The emission wavelength of the phosphor can then be tailored by judicious choice of the emitting ion, for example in some embodiments by doping the matrix with chromium, iron, nickel, manganese, cobalt, or a combination of two or more thereof, as well as by adjusting the crystal field by modifying the composition and structure of the host matrix. In some embodiments doping the phosphor matrix with one or more of chromium, iron, nickel, manganese, and/or cobalt can tune the emission to a wavelength between about 680 nm to about 1500 nm, about 800 nm to about 1250 nm, about 680 nm, about 700 nm, about 800 nm, about 900 nm, about 1000 nm, about 1100 nm, about 1200 nm, about 1300 nm, about 1400 nm, or about 1500 nm.

By adjusting the concentration of D ions (e.g., $Cr^{3+}$) in different hosts and incorporating $Sb^{3+}$ as a co-dopant, the IR phosphors can show different body colors that range from light purple, light blue, green or deep green, yellow, beige, brown, reddish, to grey. By using $Sb^{3+}$ all the phosphors show bright IR or NIR afterglow. This makes it possible to choose different body colors covering a large color range. This can provide a big advantage for some applications.

A slight increase in the concentration of D (e.g. chromium) ions may create an emission at longer wavelength due to the presence of exchange-coupled pairs of chromium ions. These pairs have a strong phonon sideband that will further shift the emission to longer wavelength. Through this approach, one can tailor the emission wavelength easily. Because of pair emission, some phosphors show double band emissions, arising from single D (e.g., chromium) ions and D (e.g., chromium) pairs. By properly increasing the D (e.g., $Cr^{3+}$) concentration, the emission band at shorter wavelength that arises from single ions will decrease while the pair emission band at longer wavelength will increase in intensity, due to energy transfer from single ions to pairs. Antimony traps play a similar role for both single ions and pairs.

In some embodiments, $Sb^{3+}$ traps are also effective with other D ions in addition to $Cr^{3+}$, allowing the spectrum of the IR emission spectrum to be extended to significantly longer IR wavelengths. For example, $Ni^{3+}$ has a $3d^8$ electronic configuration. The emission is from $^3T_2$ to the orbital singlet ground state $^3A_2$. The emission wavelength is in the range of 1.1 to 2.1 μm. Alternatively, $Co^{2+}$ has $3d^7$ configuration. The excited state is $^4T_2$, an orbital triplet. The ground state $^4Ti$ is also a triplet. In lower symmetry sites, the T states can be split into one singlet and one doublet or three singlet states, resulting in multiple emission peaks being observed. The IR emission can be extended $^5D$, will be split into $^5T_2$ (ground state) and $^5E$. The emission is in the spectral range of 3 to 5 μm.

Figure 12:
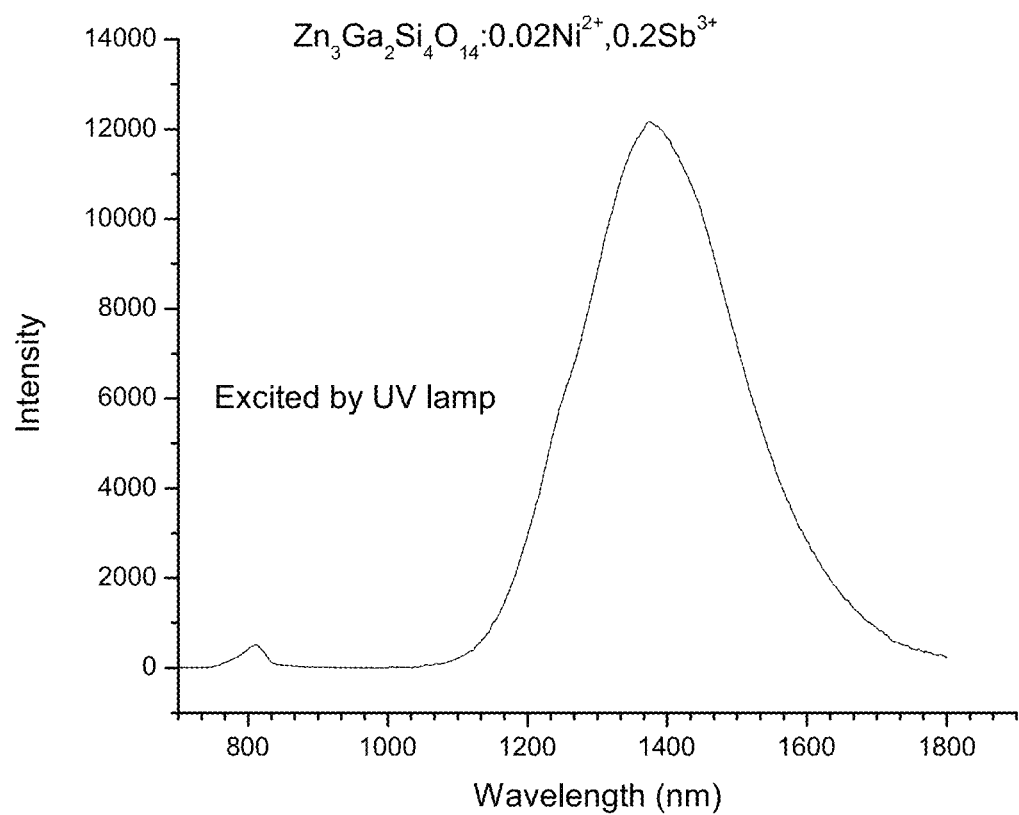
FIG. 12 shows the emission spectrum of a phosphor in accordance with an embodiment of the invention, represented by the formula $Zn_3Ga_2Si_4O_{14}:0.02Ni^{2+},0.2Sb^{3+}$, when excited by a UV lamp.
Figure 13:
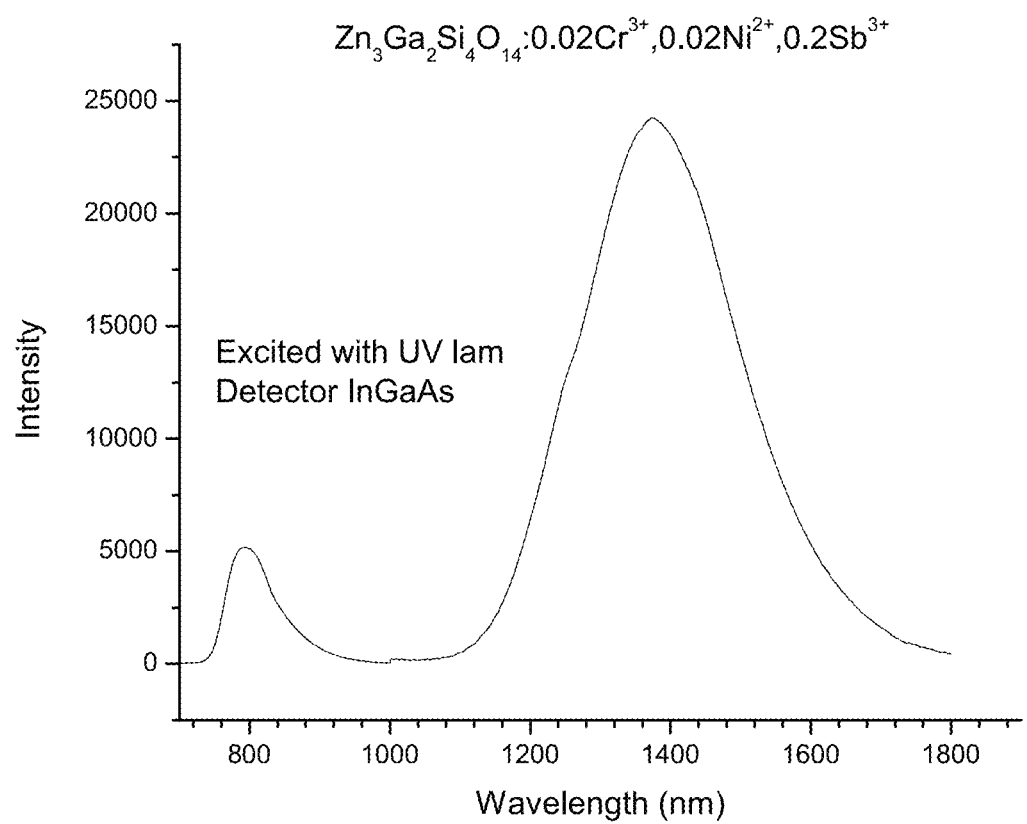
FIG. 13 shows the emission spectrum of a phosphor in accordance with an embodiment of the invention, represented by the formula $Zn_3Ga_2Si_4O_{14}:0.02Cr^{3+},0.02Ni^{2+}, 0.2Sb^{3+}$, when excited by a UV lamp.

In some embodiments, by doping or co-doping the phosphor with D (e.g., $Ni^{3+}$ and $Co^{3+}$), the emission wavelength of the afterglow of the phosphor can be extended to 1 to 3 μm. $Sb^{3+}$ ions are also active as low energy level traps in this case as well, so that the D (e.g., $Ni^{3+}$ or $Co^{3+}$) afterglow can be charged efficiently with visible light. The emission spectra of example phosphors according to embodiments of the present invention that were doped with $Ni^{2+}$ are shown in FIGS. 12 and 13.

M4

In some embodiments of the phosphor, M4 is selected from the Period 6 (rare earth) elements. Period 6 (rare earth) elements may include cesium, barium, lanthanum, cerium, praseodymium, neodymium, promethium, samarium, europium, gadolinium, terbium, dysprosium, holmium, erbium, thulium ytterbium, lutetium, hafnium, tantalum, tungsten, rhenium, osmium, iridium, platinum, gold, mercury, thallium, lead, bismuth, polonium, astatine, radon.

Figure 14:
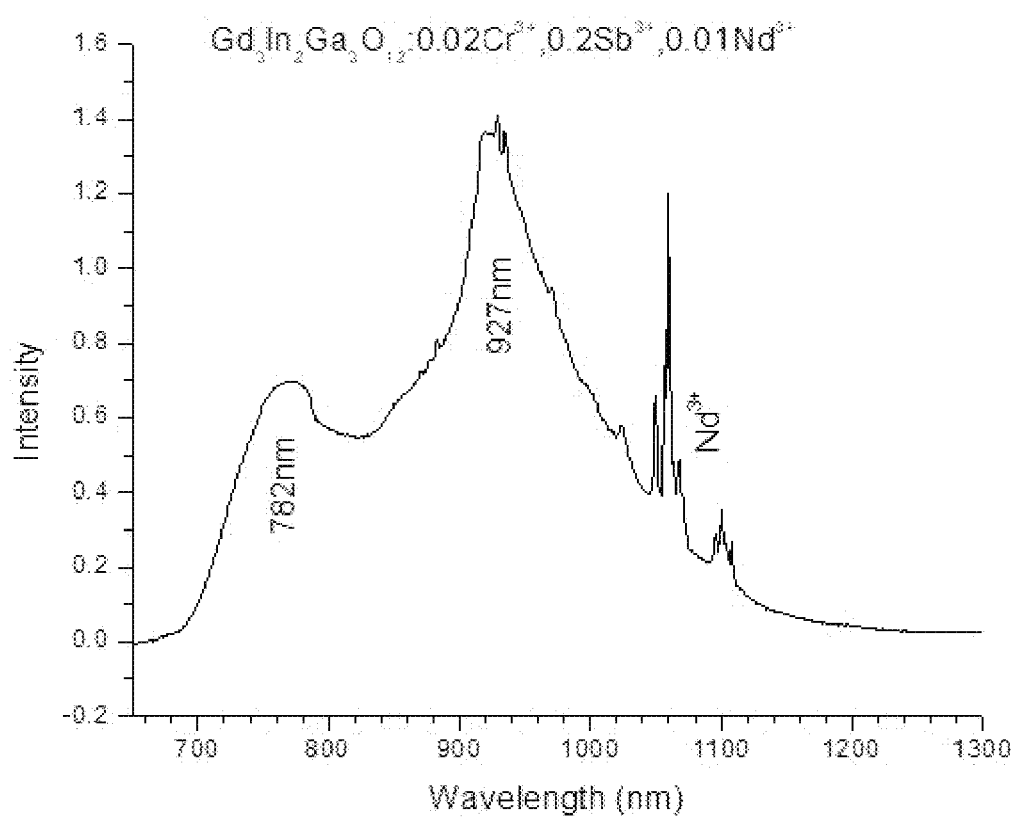
FIG. 14 shows the emission spectrum of a phosphor in accordance with an embodiment of the invention, represented by the formula $Gd_3In_2Ga_3O_{12}:0.02Cr^{3+},0.01Nd^{3+}, 0.2Sb^{3+}$.

All IR phosphors discussed above can be co-doped with one or more rare earths, such as cerium, praseodymium, neodymium, samarium, europium, terbium, dysprosium, holmium, erbium, thulium and ytterbium. The phosphors will have afterglow emissions with sharp lines (e.g., less than 20 nm full width at half maximum (FWHM), less than 10 nm FWHM, or less than 5 nm FWHM) through energy transfer from $Cr^{2+}$ or $Ni^{3+}$ to rare earths. These characteristic sharp line emissions may be useful as unique identifiers in authentication or other labeling applications in which the narrow bands present a "fingerprint" of the unique phosphor used and could be observed, for example, using a spectroscopic device, or may be detected with an optical device fitted with a narrow bandpass filter. For example, FIG. 14 shows the emission spectra of a phosphor according to an embodiment of the present invention which is co-doped with Nd. A sharp line emission occurs at about 1064 nm in this example.

EXAMPLES

The chemical powders used in the examples include ZnO (99.99%), $GeO_2$ (99.999%), $Sb_2O_3$ (99.998%), $Cr_2O_3$ (99.997%), $H_3BO_3$ (99.99%), NiO (99.0%), are all from Alfa; $Ga_2O_3$ (99.99%) from ProChem; $CaCO_3$ (99%) and $TiO_2$ (99.9%) are both from Sigma-Aldrich; $Al_2O_3$ (99.99%), $SiO_2$ (99.9%) and $SrCO_3$ (99.7%) are from China. The purity levels used can be different from the list.

The brightness and decay time of visible persistent phosphors is usually defined by observation of emission by unaided human vision. For persistent IR phosphors, however, the brightness and persistent time for IR phosphors depends on instrument observation using, for example, an IR or night vision ocular device. If the sensitivity of the ocular used is high, then one can perceive the IR afterglow as brighter and with a longer persistence time. Furthermore, imaging by an IR scope uses image intensification to enhance the detection of small amounts of light. As a result, it is important to eliminate the detection of any small amounts of background light that can interfere with the detection of the desired IR afterglow. In addition, the brightness and decay times observed also strongly depend on the overlap of the emission spectrum of the phosphor and the sensitivity peak of the scope. If the emission peak well away from the sensitivity peak of the device, then it will appear weaker. The IR scope used is in the examples is NVD-PVS14-P Mono Night Vision, N.V. Depot, with sensitivity extending to about 850 nm.

Example 1. $Zn_3Ga_{2(0.99-x)}Ge_4O_{14}:0.02Cr^{3+},2xSb^{3+}$

| | ZnO | | $Ga_2O_3$ | | $GeO_2$ | | $Sb_2O_3$ | | $Cr_2O_3$ | |
|---|---|---|---|---|---|---|---|---|---|---|
| x | g | mmol Zn | g | mmol Ga | g | mmol Ge | g | mmol Sb | g | mmol Cr |
| 0 | 2.4414 | 30.000 | 1.8557 | 19.801 | 4.1844 | 39.989 | 0.0000 | 0.0000 | 0.0152 | 0.2000 |
| 0.02 | 2.4414 | 30.000 | 1.8370 | 19.601 | 4.1844 | 39.989 | 0.0292 | 0.2003 | 0.0152 | 0.2000 |
| 0.04 | 2.4414 | 30.000 | 1.8182 | 19.401 | 4.1844 | 39.989 | 0.0584 | 0.4007 | 0.0152 | 0.2000 |
| 0.10 | 2.4414 | 30.000 | 1.7620 | 18.801 | 4.1844 | 39.989 | 0.1457 | 0.9996 | 0.0152 | 0.2000 |
| 0.20 | 2.4414 | 30.000 | 1.6683 | 17.801 | 4.1844 | 39.989 | 0.2915 | 1.9999 | 0.0152 | 0.2000 |

All the chemicals are mixed and ground uniformly, and loaded into alumina combustion boats. Compositions are pre-sintered at 800° C. for 2 hours. The pre-sintered composition is then ground again, followed by sintering below 1100° C. for four hours.

FIG. 1 is a photograph of IR afterglow, shortly after excitation, of $Zn_3Ga_2Ge_4O_{14}:0.02Cr^{3+},xSb^{3+}$, where: (1) x=0.0; (2) x=0.04; (3) x=0.10; (4) x=0.20. It can be seen that after incorporation of $Sb^{3+}$, the brightness of the phosphor becomes obviously stronger. The sample with $Sb^{3+}$ doping of x=0.10 shows the brightest glow. The samples are excited under fluorescent room light. The photo was taken through a Monocular Night Vision Scope NVD-PVS14-P. As observed with the infrared scope, the incorporation of $Sb_2O_3$ increases the brightness of the IR afterglow compared to the analogous phosphor lacking antimony as a dopant and prolongs the persistence.

The phosphor with $Sb^{3+}$ doping of x=0.10, relative to gallium shows the brightest IR afterglow.

Figure 5:
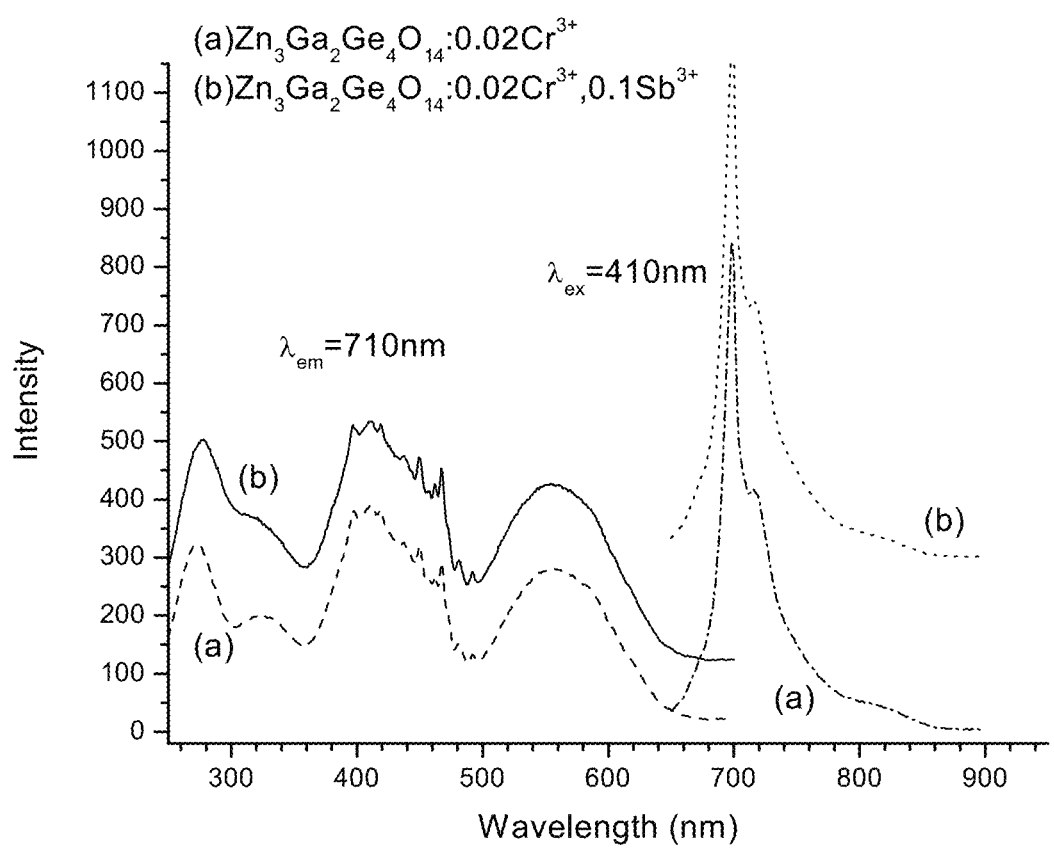
FIG. 5 shows the excitation and emission spectra of a phosphor in accordance with an embodiment of the invention, represented by the formula $Zn_3Ga_2Ge_4O_{14}:0.02Cr^{3+}$, incorporated with $0.1Sb^{3+}$ and a phosphor in accordance with another embodiment of the invention, represented by the formula $Zn_3Ga_2Ge_4O_{14}:0.02Cr^{3+}$, without $Sb^{3+}$.

FIG. 5 shows the emission and excitation spectra of the samples with doping by $Sb^{3+}$ of x=0 and x=0.1. FIG. 5 shows the excitation and emission spectra of $Zn_3Ga_2Ge_4O_{14}:0.02Cr^{3+}$ incorporated with $0.1Sb^{3+}$ and without $Sb^{3+}$.

Example 2. $Zn_3Ga_{2(0.99-x)}Si_4O_{14}:0.02Cr^{3+},2xSb^{3+}$

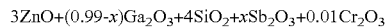

| | ZnO | | $Ga_2O_3$ | | $SiO_2$ | | $Sb_2O_3$ | | $Cr_2O_3$ | |
|---|---|---|---|---|---|---|---|---|---|---|
| x | g | mmol Zn | g | mmol Ga | g | mmol Si | g | mmol Sb | g | mmol Cr |
| 0 | 2.4414 | 30.000 | 1.8557 | 19.801 | 2.4034 | 40.000 | 0.0000 | 0.0000 | 0.0152 | 0.2000 |
| 0.05 | 2.4414 | 30.000 | 1.762 | 18.801 | 2.4034 | 40.000 | 0.1475 | 1.0119 | 0.0152 | 0.2000 |
| 0.10 | 2.4414 | 30.000 | 1.6683 | 17.801 | 2.4034 | 40.000 | 0.2915 | 1.9999 | 0.0152 | 0.2000 |
| 0.15 | 2.4414 | 30.000 | 1.5745 | 16.800 | 2.4034 | 40.000 | 0.4372 | 2.9995 | 0.0152 | 0.2000 |

Figure 2:
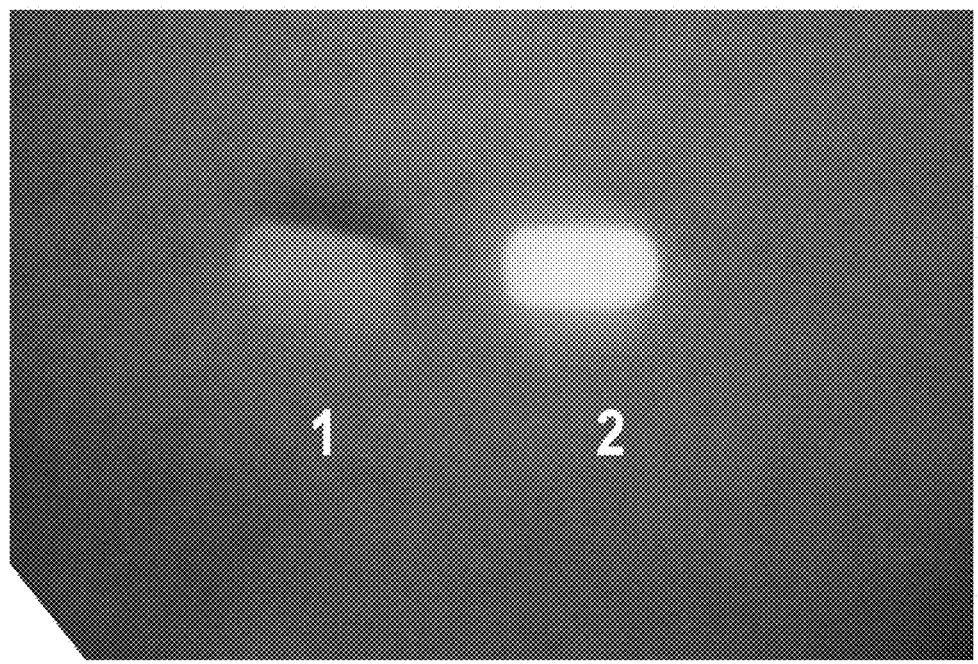
FIG. 2 is a photograph of the IR afterglow, shortly after excitation, of two phosphors in accordance with embodiments of the invention, represented by the formula $Zn_3Ga_2Si_4O_{14}:0.02Cr^{3+}$, where in (1) without incorporation of $Sb^{3+}$ and (2) with incorporation of $Sb^{3+}$.

The phosphors are prepared by the method described in Example 1. The pre-sintering temperature can be up to 950° C., and final sintering temperature can be up to 1300° C. or higher. FIG. 2 is a photograph of IR afterglow, shortly after excitation, of phosphors of $Zn_3Ga_2Si_4O_{14}:0.02Cr^{3+}$ with (1) no $Sb^{3+}$ and with (2) $Sb^{3+}$ doping of x=0.2 incorporated. It can be seen that the sample with Sb' incorporated shows very bright afterglow. The samples are excited under fluorescent room light. The photo was taken through a Monocular Night Vision Scope NVD-PVS14-P. It can be seen that the sample with 0.2 Sb' is much brighter. The afterglow of the sample without Sb is barely seen under the IR scope.

Figure 6:
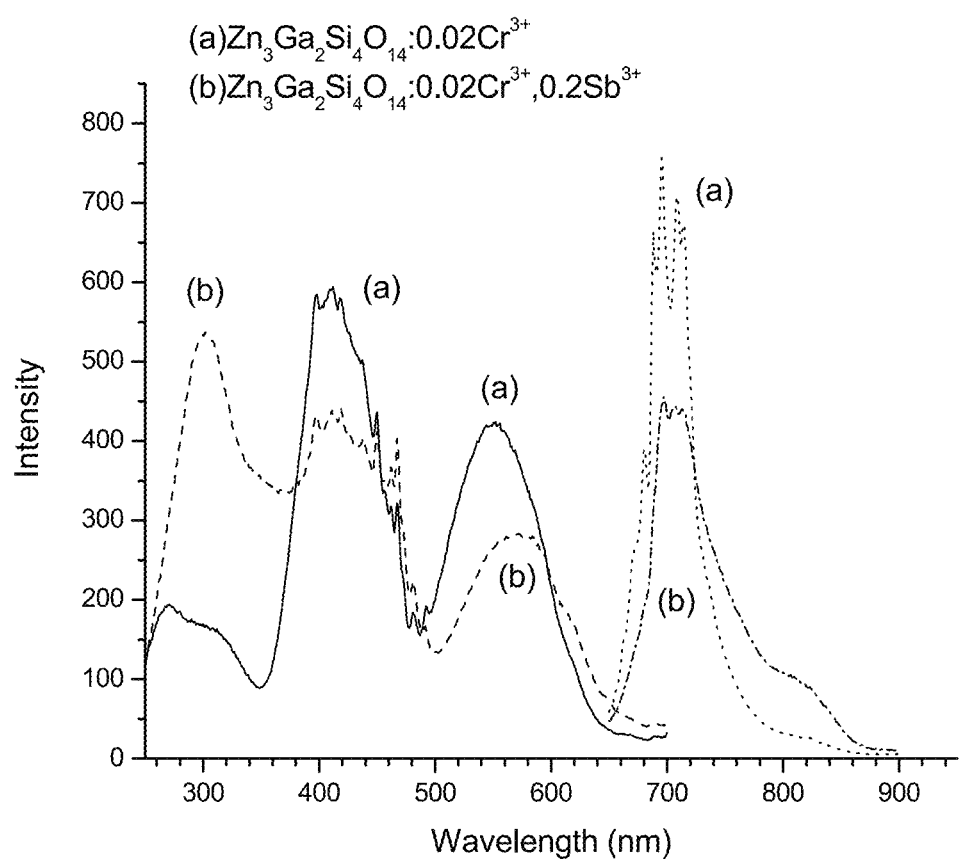
FIG. 6 shows the excitation and emission spectra of a phosphor in accordance with an embodiment of the invention, represented by the formula $Zn_3Ga_2Si_4O_{14}:0.02Cr^{3+}$, incorporated with 0.2Sb' and a phosphor in accordance with another embodiment of the invention, represented by the formula $Zn_3Ga_2Si_4O_{14}:0.02Cr^{3+}$, without $Sb^{3+}$.

The excitation and emission spectra are shown in FIG. 6. FIG. 6 shows the excitation and emission spectra of $Zn_3Ga_2Si_4O_{14}:0.02Cr^{3+}$ incorporated with $0.2Sb^{3+}$ and without $Sb^{3+}$.

Example 3. $Ca_3Ga_{2(0.99-x)}Si_4O_{14}:0.02Cr^{3+}, 2xSb^{3+}$

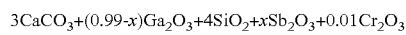

$3CaCO_3+(0.99-x)Ga_2O_3+4SiO_2+xSb_2O_3+0.01Cr_2O_3$

|  | CaCO₃ | | Ga₂O₃ | | SiO₂ | | Sb₂O₃ | | Cr₂O₃ | |
| --- | --- | --- | --- | --- | --- | --- | --- | --- | --- | --- |
| x | g | mmol Ca | g | mmol Ga | g | mmol Si | g | mmol Sb | g | mmol Cr |
| 0 | 3.0267 | 30.241 | 1.8557 | 19.801 | 2.4034 | 40.000 | 0 | 0 | 0.0152 | 0.2000 |
| 0.05 | 3.0267 | 30.241 | 1.762 | 18.801 | 2.4034 | 40.000 | 0.1475 | 1.0119 | 0.0152 | 0.2000 |
| 0.10 | 3.0267 | 30.241 | 1.6683 | 17.801 | 2.4034 | 40.000 | 0.2915 | 1.9999 | 0.0152 | 0.2000 |
| 0.15 | 3.0267 | 30.241 | 1.5745 | 16.800 | 2.4034 | 40.000 | 0.4372 | 2.9995 | 0.0152 | 0.2000 |

Figure 7:
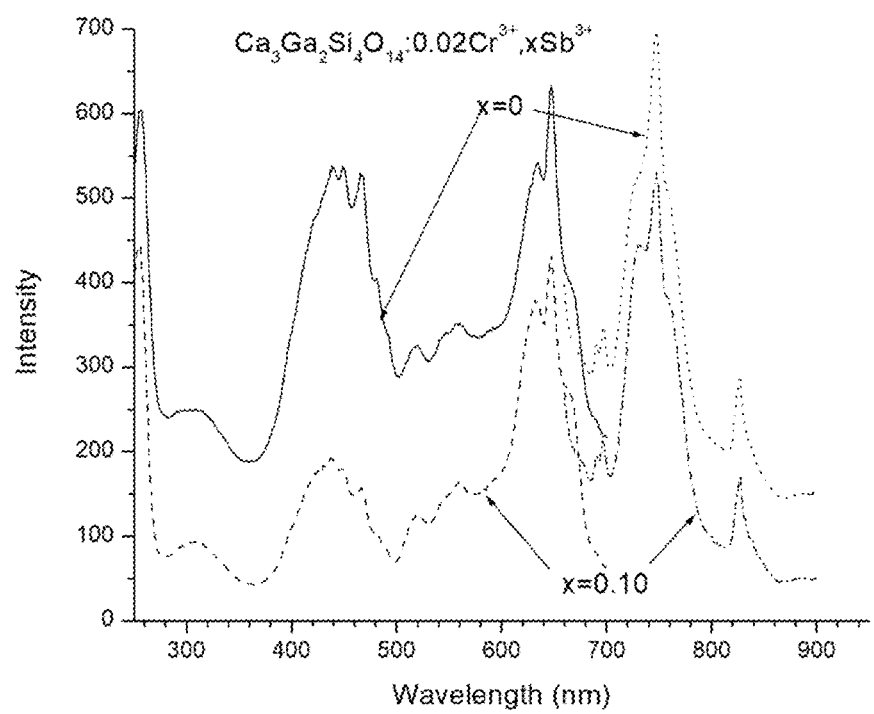
FIG. 7 shows the excitation and emission spectra of a phosphor in accordance with an embodiment of the invention, represented by the formula $Ca_3Ga_2Si_4O_{14}:0.02Cr^{3+}$, incorporated with $0.1Sb^{3+}$ and a phosphor in accordance with another embodiment of the invention, represented by the formula $Ca_3Ga_2Si_4O_{14}:0.02Cr^{3+}$, without $Sb^{3+}$.

The phosphors can be sintered around 1200° C. in air for four hours. The emission and excitation spectra are shown in FIG. 7. FIG. 7 shows the excitation and emission spectra of phosphors $Ca_3Ga_2Si_4O_{14}:0.02Cr^{3+}$ incorporated with $0.1Sb^{3+}$ and without $Sb^{3+}$.

Example 4. $Sr_3Ga_{2(0.99-x)}Si_4O_{14}:0.02Cr^{3+}, 2xSb^{3+}$

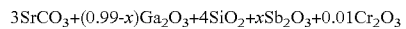

$3SrCO_3+(0.99-x)Ga_2O_3+4SiO_2+xSb_2O_3+0.01Cr_2O_3$

|  | SrCO₃ | | Ga₂O₃ | | SiO₂ | | Sb₂O₃ | | Cr₂O₃ | |
| --- | --- | --- | --- | --- | --- | --- | --- | --- | --- | --- |
| x | g | mmol Sr | g | mmol Ga | g | mmol Si | g | mmol Sb | g | mmol Cr |
| 0 | 4.4289 | 30.000 | 1.8557 | 19.801 | 2.4034 | 40.000 | 0 | 0 | 0.0152 | 0.2000 |
| 0.05 | 4.4289 | 30.000 | 1.7620 | 18.801 | 2.4034 | 40.000 | 0.1475 | 1.0129 | 0.0152 | 0.2000 |
| 0.10 | 4.4289 | 30.000 | 1.6683 | 17.801 | 2.4034 | 40.000 | 0.2915 | 1.9999 | 0.0152 | 0.2000 |
| 0.15 | 4.4289 | 30.000 | 1.5745 | 16.800 | 2.4034 | 40.000 | 0.4372 | 2.9995 | 0.0152 | 0.2000 |

The phosphors can be sintered around 1250° C. in air for four hours.

Example 5. $M1_3Ga_{1.78}Ti_4O_{14}:0.02Cr^{3+},0.2Sb^{3+}$ $$3M1O + 0.89Ga_2O_3 + 4TiO_2 + 0.10Sb_2O_3 + 0.01Cr_2O_3$$

|  | M1= | | | | | | | | | |
|---|---|---|---|---|---|---|---|---|---|---|
|  | M1 | | $Ga_2O_3$ | | $TiO_2$ | | $Sb_2O_3$ | | $Cr_2O_3$ | |
|  | g | mmol M1 | g | mmol Ga | g | mmol Ti | g | mmol Sb | g | mmol Cr |
| Zn (as ZnO) | 2.4414 | 30.000 | 1.6683 | 17.801 | 3.1952 | 40.007 | 0.2915 | 1.9999 | 0.0152 | 0.2000 |
| Ca (as $CaCO_3$) | 3.0027 | 30.001 | 1.6683 | 17.801 | 3.1952 | 40.007 | 0.2915 | 1.9999 | 0.0152 | 0.2000 |
| Sr (as $SrCO_3$) | 4.4289 | 30.000 | 1.6683 | 17.801 | 3.1952 | 40.007 | 0.2915 | 1.9999 | 0.0152 | 0.2000 |

The phosphors can be sintered around 1300° C. in air for four hours.

FIG. 3 is a photograph of the IR afterglow, shortly after excitation, of phosphors (1) Garnet gallate $Zn_3Ga_2Si_3O_{12}:0.02Cr^{3+},0.3Sb^{3+}$; (2) Trigonal gallate $Ca_3Ga_2Ti_4O_{14}:0.02Cr^{3+},0.3Sb^{3+}$; and (3) Lanthanum gallate $La_3Ga_5SiO_{14}:0.02Cr^{3+},0.3Sb^{3+}$. All samples show quite strong afterglow. The afterglow of the corresponding samples without $Sb^{3+}$ is too weak to be detected (not shown). The afterglow from samples (2) and (3) appear weaker because their emission wavelengths are shifted to the longer wavelength, to which the scope is less sensitive. The samples are excited under fluorescent room light. The photo was taken through a Monocular Night Vision Scope NVD-PVS 14-P.

The emission and excitation spectra for M1=Ca are shown in FIG. 8. FIG. 8 shows the excitation and emission spectra of phosphor $Ca_3Ga_2Ti_4O_{14}:0.02Cr^{3+},0.2Sb^{3+}$.

Example 6. $Zn_3Ga_{2(0.88-3)}Si_4O_{14}:2yAl^{4+},0.02Cr^{3+},0.2Sb^{3+}$ $$3ZnO + (0.88-y)Ga_2O_3 + yAl_2O_3 + 4SiO_2 + 0.1Sb_2O_3 + 0.01Cr_2O_3$$

|  | ZnO | | $Ga_2O_3$ | | $SiO_2$ | | $Al_2O_3$ | | $Sb_2O_3$ | | $Cr_2O_3$ | |
|---|---|---|---|---|---|---|---|---|---|---|---|---|
| y | g | mmol Zn | g | mmol Ga | g | mmol Si | g | mmol Al | g | mmol Sb | g | mmol Cr |
| 0 | 2.4414 | 30.000 | 1.6683 | 17.801 | 2.4034 | 40.000 | 0 | 0.000 | 0.2915 | 1.9999 | 0.0152 | 0.2000 |
| 0.2 | 2.4414 | 30.000 | 1.2934 | 13.801 | 2.4034 | 40.000 | 0.2039 | 2.000 | 0.2915 | 1.9999 | 0.0152 | 0.2000 |
| 0.4 | 2.4414 | 30.000 | 0.9185 | 9.801 | 2.4034 | 40.000 | 0.4078 | 4.000 | 0.2915 | 1.9999 | 0.0152 | 0.2000 |
| 0.6 | 2.4414 | 30.000 | 0.5436 | 5.800 | 2.4034 | 40.000 | 0.6118 | 6.000 | 0.2915 | 1.9999 | 0.0152 | 0.2000 |
| 0.8 | 2.4414 | 30.000 | 0.1687 | 1.800 | 2.4034 | 40.000 | 0.8157 | 8.000 | 0.2915 | 1.9999 | 0.0152 | 0.2000 |

The phosphors can be sintered around 1300° C. in air for four hours.

Figure 4:
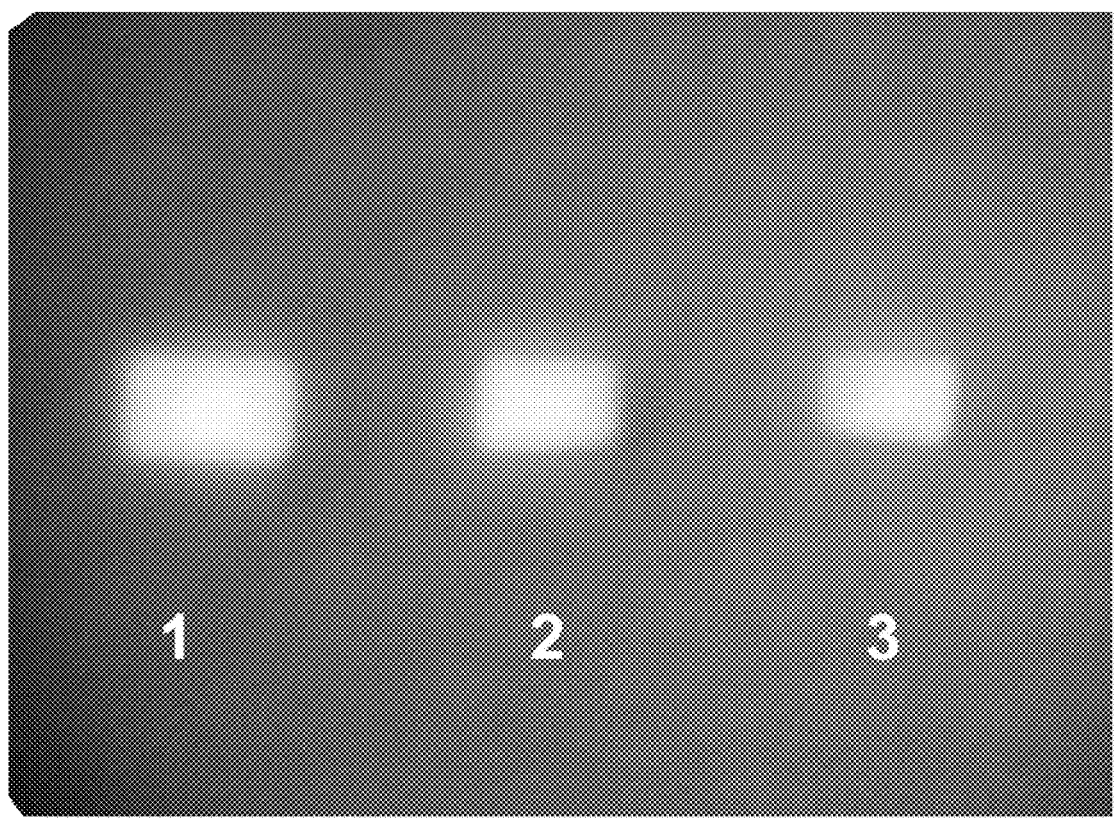
FIG. 4 is a photograph of the IR afterglow, shortly after excitation, of three phosphors each in accordance with an embodiment of the invention represented by the formula $Zn_3Ga_{1.68-x}Al_xSi_4O_{12}:0.02Cr^{3+},0.3Sb^{3+}$, where in image (1) x=0.4; in image (2) x=0.8; and in image (3) x=1.2.

FIG. 4 is a photograph of the IR afterglow, shortly after excitation, of phosphors $Zn_3Ga_{1.68-y}Al_ySi_4O_{12}:0.02Cr^{3+}$, $0.3Sb^{3+}$, where (1) y=0.4; (2) y=0.8; (3) y=1.2. Because of incorporation of $Sb^{3+}(0.3)$, the phosphors still show strong afterglow. Without $Sb^{3+}$, those samples with higher Al do not show detectable afterglow. The samples are excited under fluorescent room light. The photo was taken through a Monocular Night Vision Scope NVD-PVS14-P.

FIG. 9 are the excitation and emission spectra of the phosphor $Zn_3Ga_{1.38}Si_4Al_{0.4}O_{14}:0.02Cr^{3+},0.2Sb^{3+}$.

The photos showing the brightness under IR scope are shown in FIG. 4.

Example 7. $La_3Ga_{4.88}SiO_{14}:0.02Cr^{3+},0.1Sb^{3+}$ $3La_2O_3+4.88Ga_2O_3+2SiO_2+0.10Sb_2O_3+0.02Cr_2O_3$

| La$_2$O$_3$ | | Ga$_2$O$_3$ | | SiO$_2$ | | Sb$_2$O$_3$ | | Cr$_2$O$_3$ | |
|---|---|---|---|---|---|---|---|---|---|
| g | mmol La | G | mmol Ga | g | mmol Si | g | mmol Sb | g | mmol Cr |
| 9.7743 | 30.000 | 9.1473 | 97.603 | 1.2017 | 20.000 | 0.2915 | 1.9999 | 0.0304 | 0.4000 |

The phosphors can be sintered around 1300° C. in air for four hours.

Figure 10:
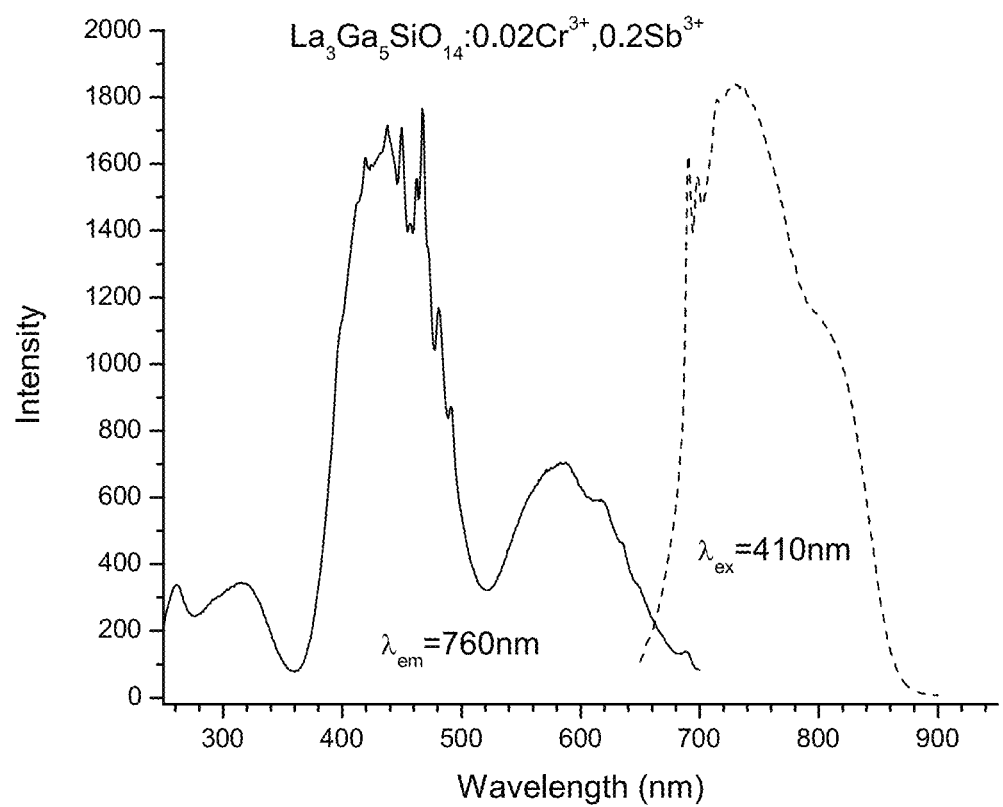
FIG. 10 shows the excitation and emission spectra of a phosphor in accordance with an embodiment of the invention, represented by the formula $La_3Ga_5SiO_{14}:0.02Cr^{3+}, 0.2Sb^{3+}$.

The emission and excitation spectra of phosphor $La_3Ga_5SiO_{14}:0.02Cr^{3+},0.2Sb^{3+}$ are shown in FIG. 10. The photo is shown in FIG. 3(3).

Example 8. Garnet $Ca_3Ga_{1.78}Si_3O_{12}:0.02Cr^{3+}, 0.2Sb^{3+}$ $3CaCO_3+0.89Ga_2O_3+3SiO_2+0.10Sb_2O_3+0.01Cr_2O_3$

| CaCO3 | | Ga$_2$O$_3$ | | SiO$_2$ | | Sb$_2$O$_3$ | | Cr$_2$O$_3$ | |
|---|---|---|---|---|---|---|---|---|---|
| g | mmol M | g | mmol Ga | g | mmol Si | g | mmol Sb | g | mmol Cr |
| 3.0027 | 30.001 | 1.6683 | 17.801 | 1.8025 | 30.000 | 0.2915 | 1.9999 | 0.0152 | 0.2000 |

Figure 11:
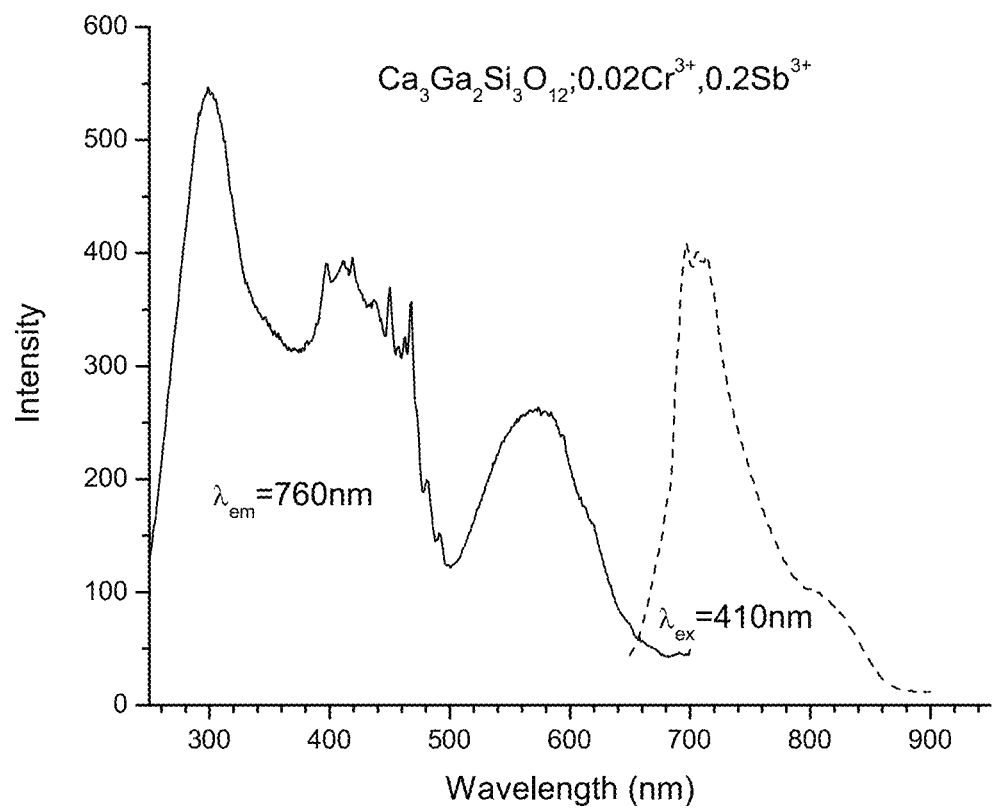
FIG. 11 shows the excitation and emission spectra of a garnet gallate phosphor in accordance with an embodiment of the invention, represented by the formula $Ca_3Ga_2Si_3O_{12}: 0.02Cr^{3+},0.2Sb^{3+}$.

The phosphors can be sintered around 1300° C. in air for four hours. The emission and excitation spectra of garnet gallate $Ca_3Ga_2Si_3O_{12}:0.02Cr^{3+},0.2Sb^{3+}$ are shown in FIG. 11. The photo of the IR afterglow is shown in FIG. 3(1).

Example 9. Gallate Phosphors with Nickel ($Ni^{2+}$) Ions: $Zn_3Ga_2Si_4O_{14}:0.01Ni^{2+},0.2Sb^{3+}$ $3ZnO+0.85Ga_2O_3+4SiO_2+0.1Sb_2O_3+0.1Cr_2O_3$

| ZnO | | Ga$_2$O$_3$ | | SiO$_2$ | | Sb$_2$O$_3$ | | NiO | |
|---|---|---|---|---|---|---|---|---|---|
| g | mmol Zn | G | mmol Ga | g | mmol Si | g | Mmol Sb | g | mmol Ni |
| 2.4414 | 30.000 | 1.6683 | 17.801 | 2.4034 | 40.000 | 0.2915 | 1.9999 | 0.0149 | 0.1995 |

The phosphors can be sintered around 1200° C. in air for four hours. The emission and excitation spectra of the phosphor $Zn_3Ga_2Si_4O_{14}$:0.02Ni,0.2Sb are shown in FIG. 12.

Example 10. Gallate Phosphors with Chromium ($Cr^{3+}$) and Nickel ($Ni^{2+}$) Ions: $Zn_3Ga_{1.76}Si_4O_{14}$: $0.02Cr^{3+},0.02Ni^{2+},0.2Sb^{3+}$ $3ZnO+0.88Ga_2O_3+4SiO_2+0.10Sb_2O_3+0.01Cr_2O_3+$
$0.02NiO+0.04H_3BO_3$

| ZnO | | $Ga_2O_3$ | | $SiO_2$ | | $Sb_2O_3$ | | $Cr_2O_3$ | | NiO | |
|---|---|---|---|---|---|---|---|---|---|---|---|
| g | mmol Zn | g | mmol Ga | g | mmol Si | g | mmol Sb | g | mmol Cr | g | mmol Ni |
| 2.4414 | 30.000 | 1.6495 | 17.600 | 2.4034 | 40.000 | 0.2915 | 1.9999 | 0.0152 | 0.2000 | 0.0149 | 0.1995 |

The phosphors can be sintered around 1200° C. in air for four hours. The emission and excitation spectra of the phosphor $Zn_3Ga_2Si_4O_{14}$:$0.02Cr,0.02Ni^{2+},0.2Sb^{3+}$ are shown in FIG. 13.

Example 11. Garnet with Incorporation of Indium (in $^{3+}$) and Rare Earth Ions: $Gd_{2.995}In_{1.89}Ga_3O_{12}$: $0.02Cr^{3+},0.01Nd^{3+},0.2Sb^{3+}$ $2.995Gd_2O_3+1.89In_2O_3+3Ga_2O_3+0.10Sb_2O_3+$
$0.01Cr_2O_3+0.005Nd_2O_3$

| $Gd_2O_3$ | | $In_2O_3$ | | $Ga_2O_3$ | | $Sb_2O_3$ | | $Cr_2O_3$ | | $Nd_2O_3$ | |
|---|---|---|---|---|---|---|---|---|---|---|---|
| g | mmol Gd | g | mmol In | g | mmol Ga | g | mmol Sb | g | mmol Cr | g | mmol Nd |
| 10.8568 | 59.900 | 5.2473 | 31.189 | 5.6233 | 60.002 | 0.2915 | 1.99988 | 0.0152 | 0.2000 | 0.0168 | 0.0999 |

The phosphor is prepared with the method in example 1, but sintering temperature is 1300° C. The emission spectrum of the phosphor $Gd_3In_2Ga_3O_{12}$:$0.02Cr^{3+},0.01Nd^{3+},0.2Sb'$ is shown in FIG. 14. It can be seen that an emission peak at 927 nm appears, and sharp lines near 1064 nm also show up.

Phosphors according to embodiments of the present invention may be used in place of existing phosphors, particular in purposes and applications which would benefit from phosphors which emit in the IR or near-IR wavelengths. In some embodiments, phosphors according to certain embodiments of the present invention may be, for example, used in inks or paints for security, authentication, military applications such as tagging-and-tracking, friend-or-foe ID, among others. In some such embodiments, a composition for use in paints or inks may include one or more of the phosphors of the present invention together with a polymer or resin. Polymers may include, but are not limited to, acrylics, polyurethanes, polyesters, polycarbonates, styrenes, and copolymers.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

The invention claimed is:

1. A phosphor having the formula:

$$M1_{(m-k)}Ga_{(2n-x-y-z)}M2_pO_{(rm+3n+2p)}:xSb^{3+},yM3,zD,kM4$$

where M1 is magnesium, calcium, strontium, barium, zinc, scandium, yttrium, lanthanum, gadolinium, lutetium, bismuth, or combinations thereof; and M2 is silicon, germanium, tin, titanium, zirconium, or combinations thereof; and M3 is magnesium, aluminum, indium, scandium, or combinations thereof; and M4 is praseodymium, neodymium, samarium, europium, terbium, dysprosium, holmium, erbium, thulium, ytterbium, or combinations thereof; and D is chromium, iron, nickel, manganese, or cobalt, or combinations thereof; such that $1 \leq m \leq 4$
$1 \leq n \leq 3$;
$0 \leq p \leq 5$
$0.0002 \leq x \leq 2n$;
$0 \leq y \leq 2n$;
$0.0001 \leq z \leq 0.1$;
$0 \leq k \leq 0.1$; and
r is selected from 1, 1.5, 2, 2.5, and 3.

2. The phosphor of claim 1, wherein when M1 comprises magnesium, calcium, strontium, barium, zinc, or a combination thereof, a portion of the magnesium, calcium, strontium, barium, zinc, or combination thereof is substituted with a mixture comprising 50 mole % gallium and 50 mole % lithium, sodium, potassium, or a combination thereof.

3. The phosphor of claim 1, wherein, when M1 comprises magnesium, calcium, strontium, barium, zinc, or a combination thereof, a portion of the magnesium, calcium, strontium, barium, zinc, or combination thereof is substituted with a mixture comprising 50 mole % lanthanum, scandium, yttrium, gadolinium, lutetium, or bismuth, or combinations thereof, and 50 mole % lithium, sodium, potassium, or a combination thereof, and wherein a portion of M2 is substituted with a mixture comprising about 50 mole % gallium and about 50 mole % tantalum, niobium, or a combination thereof.

4. The phosphor of claim 1, wherein the phosphor has the formula:

$$M1_{3-k}Ga_{(2-x-y-z)}Si_qM2_pO_{14}{:}xSb^{3+},yM3,zD,kM4$$

wherein M1 is magnesium, calcium, strontium, barium, zinc, or combinations thereof and M2 is germanium, tin, titanium, of zirconium, or combinations thereof; and M3 is aluminum, scandium, indium, or combinations thereof; and D is chromium, iron, nickel, manganese, cobalt, or combinations thereof; and M4 is praseodymium, neodymium, samarium, europium, terbium, dysprosium, holmium, erbium, thulium ytterbium, or combinations thereof, or combinations thereof, such that $4 \geq q \geq 1$;
$(p+q)=4$;
$0.002 \leq x \leq 2$;
$0 \leq y \leq 2$;
$0.0001 \leq z \leq 0.1$
$0 \leq k \leq 0.1$.

5. The phosphor of claim 1, wherein the phosphor has the formula:

$$M1_{3-k}Ga_{(5-x-y-z)}SiO_{14}{:}xSb^{3+},yM3,zD,kM4$$

where M1 is lanthanum, gadolinium, yttrium, lutetium, or bismuth, or combinations thereof;

M3 is magnesium, aluminum, scandium, indium, or magnesium, or combinations thereof; and M4 is praseodymium, neodymium, samarium, europium, terbium, dysprosium, holmium, erbium, thulium, ytterbium, or combinations thereof; and D is chromium, iron, nickel, manganese, or cobalt, or combinations thereof; such that $0.0001 \leq x \leq 5$;
$0 \leq y \leq 5$;
$0.0001 \leq z \leq 0.2$;
$0 \leq k \leq 0.1$.

6. The phosphor of claim 1, wherein the phosphor has the formula:

$$M1_{3-k}Ga_{(2-x-y-z)}Si_3O_{12}{:}xSb^{3+},yM3,zD,kM4$$

where M1 is calcium, strontium, barium, zinc, or combinations thereof;

M3 is magnesium, aluminum, scandium, indium, or magnesium, or combinations thereof; and M4 is praseodymium, neodymium, samarium, europium, terbium, dysprosium, holmium, erbium, thulium, ytterbium, or combinations thereof; and D is chromium, iron, nickel, manganese, or cobalt, or combinations thereof; such that $0.002 \leq x \leq 2$;
$0 \leq y \leq 2$;
$0.0001 \leq z \leq 0.1$; and
$0 \leq k \leq 0.1$.

7. The phosphor of claim 1, wherein the phosphor has the formula:

$$M1_{3-k}Ga_{(5-x-y-z)}O_{12}{:}xSb^{3+},yM3,zD,kM4$$

where M1 is lanthanum, gadolinium, yttrium, lutetium, or bismuth, or combinations thereof;

M3 is magnesium, aluminum, scandium, indium, or magnesium, or combinations thereof; and M4 is praseodymium, neodymium, samarium, europium, terbium, dysprosium, holmium, erbium, thulium, ytterbium, or combinations thereof; and D is chromium, iron, nickel, manganese, or cobalt, or combinations thereof; such that $0.0001 \leq x \leq 5$;
$0 \leq y \leq 5$;
$0.0001 \leq z \leq 0.2$; and
$0 \leq k \leq 0.1$.

8. The phosphor of claim 1, wherein the phosphor has the formula:

$$M1_{1-k}Ga_{(1-x-y-z)}O_3{:}xSb^{3+},yM3,zD,kM4$$

where M1 is magnesium, calcium, barium, strontium, scandium, yttrium, lanthanum, zinc, gadolinium, lutetium, or bismuth, or combinations thereof; and M3 is magnesium, aluminum, scandium, indium, or magnesium, or combinations thereof; and M4 is praseodymium, neodymium, samarium, europium, terbium, dysprosium, holmium, erbium, thulium, ytterbium, or combinations thereof; and D is chromium, iron, nickel, manganese, or cobalt, or combinations thereof; such that $0.002 \leq x \leq 1$;
$0 \leq y \leq 1$;
$0.0001 \leq z \leq 0.1$; and
$0 \leq k \leq 0.1$.

9. The phosphor of claim 1, wherein the phosphor has the formula:

$$M1Ga_{(2-x-y-z)}O_4{:}xSb^{3+},yM3,zD,kM4$$

wherein M1 is magnesium, calcium, strontium, barium, or zinc, or combinations thereof; and wherein M3 is magnesium, aluminum, scandium, indium, or combinations thereof; and wherein D is chromium, iron, nickel, manganese, or cobalt, or combinations thereof;

wherein M4 is praseodymium, neodymium, samarium, europium, terbium, dysprosium, holmium, erbium, thulium, ytterbium, or combinations thereof; such that $0.001 \leq x \leq 2$;

$0 \leq y \leq 2$;

$0.0001 \leq z \leq 0.1$; and $0 \leq k \leq 0.1$.

10. The phosphor according to claim 1, wherein D is chosen from one or more of Cr, Ni or Co, and wherein the phosphor is capable of exhibiting a persistent emission at wavelengths greater than 900 nm.

11. The phosphor according to claim 1, wherein the phosphor is capable of providing a persistent emission, wherein the persistent emission includes infrared spectral lines having a full-width half-maximum ("FWHM") bandwidth of less than about 10 nm.

12. The phosphor according to claim 1, wherein the phosphor is capable of being charged with visible light.

13. The phosphor according to claim 12, wherein the visible light is provided by a source selected from one or more of sunlight, a fluorescent lamp, UV lamp, a halogen lamp, a tungsten lamp, or a LED lamp.

14. The phosphor according to claim 1, wherein the phosphor is in a form of a powder, ceramic, glass, crystal, or nanoparticle.

15. A composition for use in paints or inks comprising:
a phosphor according to claim 1; and
a polymer or resin.

* * * * *